United States Patent
Choi et al.

(10) Patent No.: US 10,747,983 B2
(45) Date of Patent: Aug. 18, 2020

(54) ELECTRONIC DEVICE AND METHOD FOR SENSING FINGERPRINTS

(71) Applicant: Samsung Electronics Co., Ltd., Gyeonggi-do (KR)

(72) Inventors: Kyu-Hyung Choi, Seoul (KR); Na-Woong Han, Seoul (KR); Han-Soo Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 143 days.

(21) Appl. No.: 15/864,791

(22) Filed: Jan. 8, 2018

(65) Prior Publication Data
US 2018/0196991 A1   Jul. 12, 2018

(30) Foreign Application Priority Data

Jan. 6, 2017 (KR) .................. 10-2017-0002527

(51) Int. Cl.
*G06K 9/00* (2006.01)
*G06F 21/32* (2013.01)
(Continued)

(52) U.S. Cl.
CPC ....... *G06K 9/00087* (2013.01); *G06F 1/1626* (2013.01); *G06F 1/1643* (2013.01);
(Continued)

(58) Field of Classification Search
CPC ............ G06K 9/00087; G06F 3/04845; G06F 3/04847; G06F 3/04886; G06F 3/0412;
(Continued)

(56) References Cited

U.S. PATENT DOCUMENTS 9,245,166 B2 * 1/2016 Huang ............... G06K 9/00013
9,519,771 B2 * 12/2016 Fadell .................. G06F 21/316
(Continued)

FOREIGN PATENT DOCUMENTS

EP        2 907 241      8/2015
KR     1020150070599    6/2015
(Continued)

OTHER PUBLICATIONS

International Search Report dated Apr. 4, 2018 issued in counterpart application No. PCT/KR2018/000376, 10 pages.
(Continued)

*Primary Examiner* — John B Strege
(74) *Attorney, Agent, or Firm* — The Farrell Law Firm, P.C.

(57) ABSTRACT

Disclosed is an electronic device for sensing a fingerprint, including a display including at least one sensor for sensing the fingerprint, a memory, and at least one processor electrically connected with the display and the memory, wherein the processor may execute an application and display the application on the display, sense a first fingerprint inputted to at least one first region of the application displayed on the display, map the sensed first fingerprint to a function corresponding to the first region, determine whether the first fingerprint is sensed on the application, and if the first fingerprint is sensed on the display, apply the mapped function to the display.

19 Claims, 12 Drawing Sheets

(51) Int. Cl.
  *G06F 3/0488* (2013.01)
  *G06F 3/041* (2006.01)
  *G06F 1/16* (2006.01)
  *G06F 3/0484* (2013.01)
  *G06F 3/0482* (2013.01)

(52) U.S. Cl.
  CPC ............ *G06F 1/1684* (2013.01); *G06F 3/041* (2013.01); *G06F 3/0412* (2013.01); *G06F 3/0482* (2013.01); *G06F 3/04845* (2013.01); *G06F 3/04847* (2013.01); *G06F 3/04883* (2013.01); *G06F 3/04886* (2013.01); *G06F 21/32* (2013.01); *G06F 2203/0338* (2013.01); *G06F 2203/04808* (2013.01)

(58) Field of Classification Search
  CPC ................ G06F 3/04883; G06F 21/32; G06F 2203/04808
  See application file for complete search history.

(56) References Cited

U.S. PATENT DOCUMENTS

| | | | | |
|---|---|---|---|---|
| 9,652,061 | B2* | 5/2017 | North | G06F 3/041 |
| 9,697,345 | B2* | 7/2017 | Mo | G06F 21/32 |
| 9,852,277 | B2* | 12/2017 | Park | G06F 21/34 |
| 10,275,585 | B2* | 4/2019 | Fadell | G06F 21/316 |
| 2009/0102604 | A1* | 4/2009 | Madhvanath | G06F 3/03547 |
| | | | | 340/5.83 |
| 2009/0169070 | A1* | 7/2009 | Fadell | G06F 21/32 |
| | | | | 382/124 |
| 2012/0321150 | A1* | 12/2012 | Ranganathan | G06F 3/0488 |
| | | | | 382/124 |
| 2013/0129162 | A1* | 5/2013 | Cheng | G06F 21/32 |
| | | | | 382/124 |
| 2013/0324089 | A1* | 12/2013 | Kim | G06F 21/32 |
| | | | | 455/411 |
| 2014/0101737 | A1 | 4/2014 | Rhee | |
| 2014/0283142 | A1* | 9/2014 | Shepherd | G06F 3/0482 |
| | | | | 726/30 |
| 2015/0169163 | A1 | 6/2015 | Lee et al. | |
| 2015/0220767 | A1* | 8/2015 | Yoon | G06K 9/00006 |
| | | | | 382/124 |
| 2015/0363632 | A1* | 12/2015 | Ahn | G06F 3/0412 |
| | | | | 382/124 |
| 2015/0371073 | A1* | 12/2015 | Cho | G06F 3/04886 |
| | | | | 382/124 |
| 2016/0004899 | A1 | 1/2016 | Pi et al. | |
| 2016/0171281 | A1 | 6/2016 | Park et al. | |
| 2016/0217310 | A1 | 7/2016 | Shah et al. | |
| 2016/0370866 | A1 | 12/2016 | Hwang et al. | |
| 2016/0379039 | A1 | 12/2016 | Dagan et al. | |
| 2017/0213019 | A1* | 7/2017 | Mao | G06F 21/32 |

FOREIGN PATENT DOCUMENTS

| | | |
|---|---|---|
| KR | 1020160077045 | 7/2016 |
| WO | WO 2015/072677 | 5/2015 |

OTHER PUBLICATIONS

European Search Report dated Oct. 28, 2019 issued in counterpart application No. 18736141.5-1231, 7 pages.

* cited by examiner

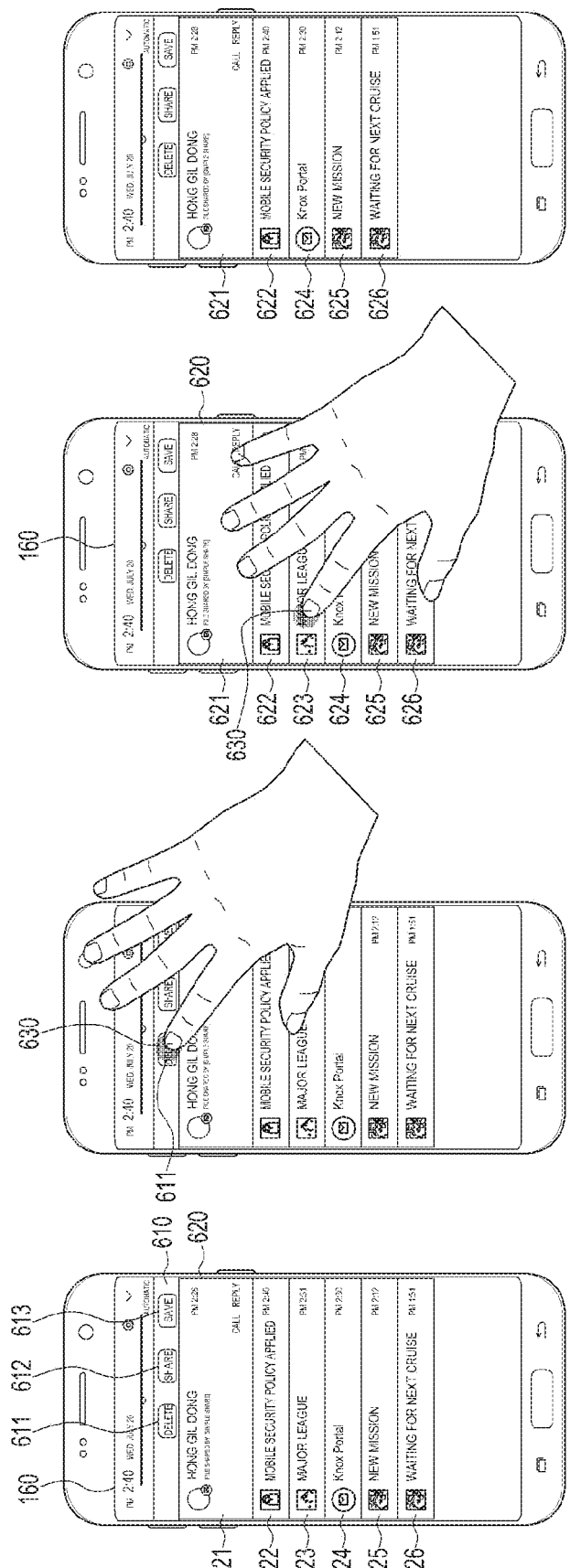

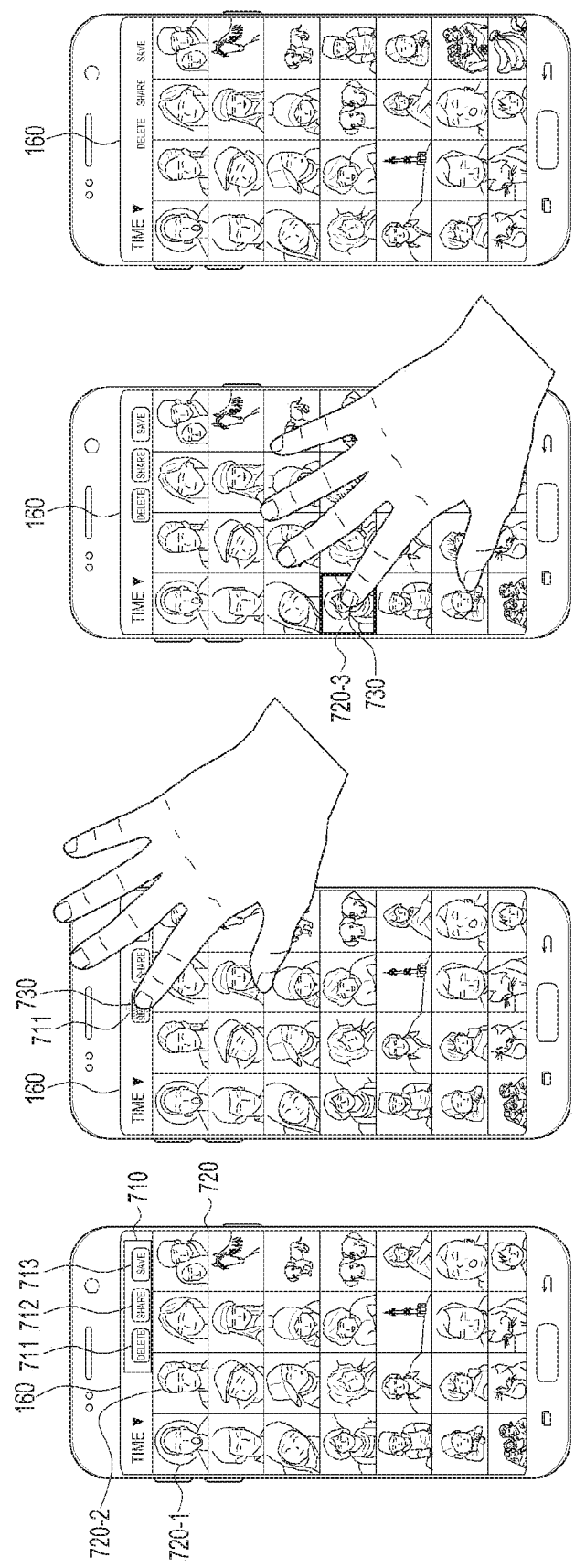

ELECTRONIC DEVICE AND METHOD FOR SENSING FINGERPRINTS

PRIORITY

This application claims priority under 35 U.S.C. § 119(a) to a Korean Patent Application filed in the Korean Intellectual Property Office on Jan. 6, 2017 and assigned Serial No. 10-2017-0002527, the contents of which are incorporated herein by reference.

BACKGROUND

1. Field of the Disclosure

The present disclosure relates generally to electronic devices, and more particularly, to methods for sensing fingerprints in electronic devices.

2. Description of the Related Art

Recently, electronic devices are providing more diversified services and additional functions. To meet users' various needs and increase use efficiency of electronic devices, communication service carriers or device manufacturers are competing to develop electronic devices equipped with diverse functionalities.

Various techniques for recognizing fingerprints are being introduced with the development of electronic devices. For example, a user's fingerprint may be used as means for authentication, in which case a fingerprint sensor may be provided in an outer portion of an electronic device.

Conventionally, a small-sized fingerprint sensor is provided in an outer portion of the electronic device to recognize the user's fingerprints. This fingerprint sensor is used only for user authentication. Each function of the electronic device may be previously assigned a fingerprint, thereby precluding use of the function for other purposes.

As such, there is a need in the art for the ability to more flexibly control the electronic device by enabling the display to be used to recognize fingerprints.

SUMMARY

The present disclosure has been made to address the above-mentioned shortcomings in the art and to provide the advantages described below.

Accordingly, an aspect of the present disclosure is to provide at least one function to which a fingerprint is to be mapped and at least one object influenced by the function as simultaneously displayed on the screen. In this state, a particular fingerprint may be mapped to an object to perform a function associated with the fingerprint.

According to an aspect the present disclosure, an electronic device for sensing a fingerprint includes a display including at least one sensor for sensing the fingerprint, a memory, and at least one processor electrically connected with the display and the memory, wherein the at least one processor senses a first fingerprint inputted to at least one first region of an application displayed on the display, maps the sensed first fingerprint to a function corresponding to the at least one first region, determines whether the first fingerprint is sensed on the display, and if the first fingerprint is sensed on the display, applies the mapped function to the display.

According to another aspect of the present disclosure, a method for sensing a fingerprint through a display including at least one sensor for sensing the fingerprint in an electronic device including the display, a memory, and a processor includes sensing a first fingerprint inputted to at least one first region of an application displayed on the display, mapping the sensed first fingerprint to a function corresponding to the first region, determining whether the first fingerprint is sensed on the display, and when the first fingerprint is sensed on the display, applying the mapped function to the display.

According to another aspect of the present disclosure, there is provided a computer readable storage medium storing a program including instructions for controlling a screen by sensing a fingerprint in an electronic device including a display including at least one sensor, a memory, and a processor, comprising sensing a first fingerprint inputted to at least one first region of an application displayed on the display, mapping the sensed first fingerprint to a function corresponding to the first region, determining whether the first fingerprint is sensed on the display, and when the first fingerprint is sensed on the display, applying the mapped function to the display.

BRIEF DESCRIPTION OF THE DRAWINGS

The above and other aspects, features, and advantages of the present disclosure will be more apparent from the following detailed description when taken in conjunction with the accompanying drawings, in which:

FIGS. 6A, 6B, 6C and 6D illustrate a process for controlling screen corresponding to a fingerprint inputted while an electronic device displays an application according to an embodiment of the present disclosure;

FIGS. 7A, 7B, 7C and 7D illustrate a process for controlling screen corresponding to a fingerprint inputted while an electronic device displays an application according to an embodiment of the present disclosure;

Throughout the drawings, like reference numerals will be understood to refer to like parts, components, and structures.

DETAILED DESCRIPTION

Figure 1:
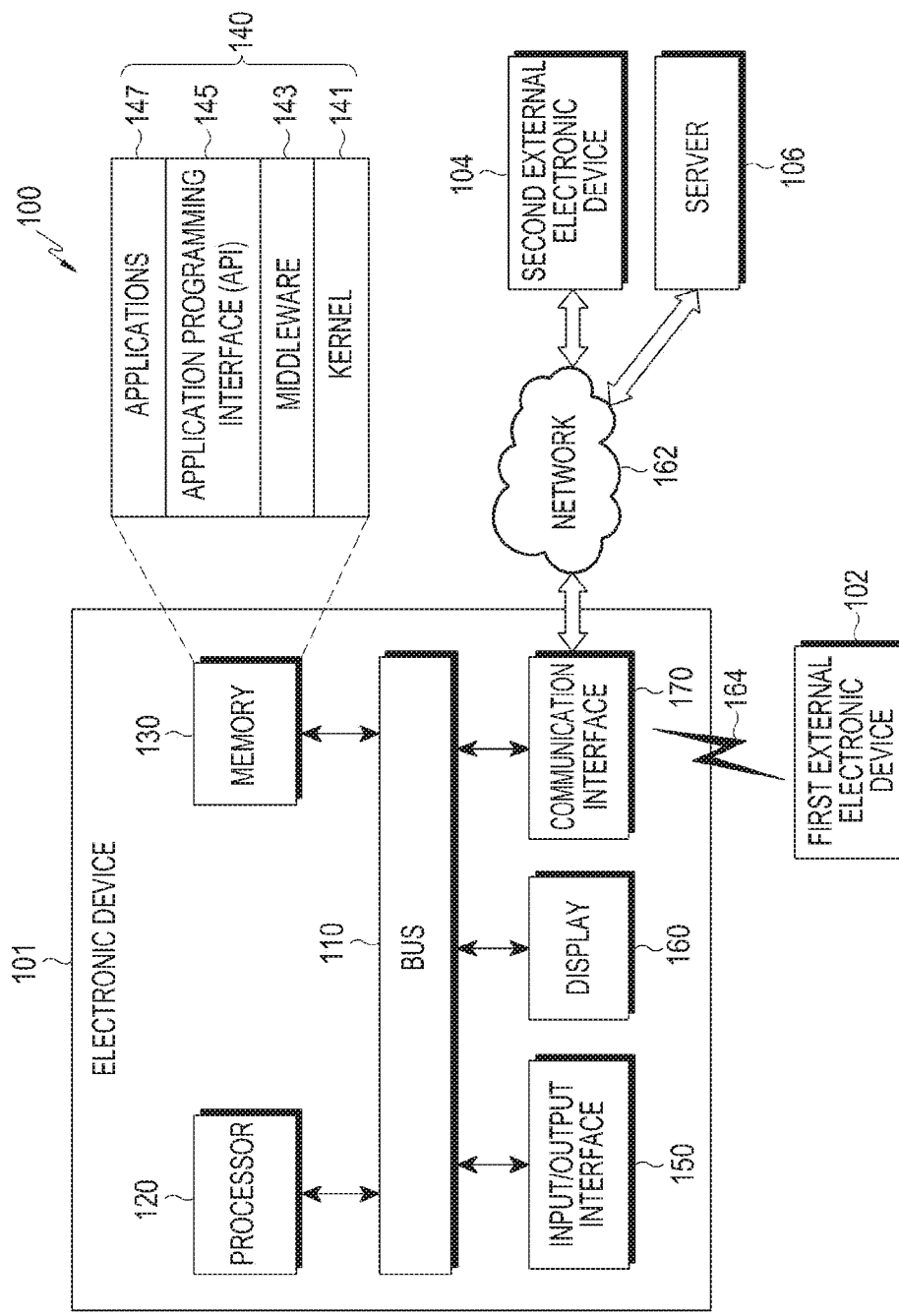
FIG. 1 illustrates an electronic device in a network environment according to an embodiment of the present disclosure.

Hereinafter, embodiments of the present disclosure are described with reference to the accompanying drawings. However, it should be appreciated that the present disclosure is not limited to the embodiments, and all changes and/or equivalents or replacements thereto are also part of the scope of the present disclosure. The same or similar reference numerals may be used to refer to the same or similar elements throughout the specification and the drawings. Description of well-known functions and/or configurations will be omitted for the sake of clarity and conciseness.

As used herein, the expressions "have," "may have," "include," or "may include" indicate the presence of features, such as a number, function, operations, or a component, and do not exclude the existence of other features.

As used herein, the expressions "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. Also, a first component may be referred to as a second component, and vice versa without departing from the scope of the present disclosure.

It will be understood that when an element, such as a first element, is referred to as being (operatively or communicatively) "coupled with/to," or "connected with/to" another element, such as a second element, it can be coupled or connected with/to the other element directly or via a third element. In contrast, it will be understood that when the first element is referred to as being "directly coupled with/to" or "directly connected with/to" the second element, no third element intervenes between the first and second elements.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor that may perform the operations by executing one or more software programs stored in a memory device or an embedded processor for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. The terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a mobile medical device, a camera, or a wearable device. The wearable device may include at least one of an accessory-type device, such as a watch, a ring, a bracelet, an anklet, a necklace, glasses, contact lenses, or a head-mounted device (HMD), a fabric- or clothes-integrated device, such as electronic clothes, a body attaching-type device, such as a skin pad or tattoo, or a body implantable device, such as an implantable circuit.

According to an embodiment of the present disclosure, the electronic device may be a home appliance. Examples of the home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box, such as Samsung HomeSync™, Apple TV™, or Google TV™, a gaming console (Xbox™ PlayStation™), an electronic dictionary, an electronic key, a camcorder, or an electronic picture frame.

According to an embodiment of the present disclosure, examples of the electronic device may include at least one of various medical devices, such as a blood sugar measuring device, a heartbeat measuring device, or a body temperature measuring device, a magnetic resource angiography (MRA) device, a magnetic resource imaging (MRI) device, a computed tomography (CT) device, an imaging device, or an ultrasonic device, a navigation device, a global navigation satellite system (GNSS) receiver, an event data recorder (EDR), a flight data recorder (FDR), an automotive infotainment device, a sailing electronic device, such as a sailing navigation device or a gyro compass, avionics, security devices, vehicular head units, industrial or home robots, automatic teller machines (ATMs), point of sales (POS) devices, or Internet of Things (IoT) devices, such as a light bulb, various sensors, an electric or gas meter, a sprinkler, a fire alarm, a thermostat, a street light, a toaster, fitness equipment, a hot water tank, a heater, or a boiler.

According to embodiments of the disclosure, examples of the electronic device may at least one of part of a piece of furniture or building/structure, an electronic board, an electronic signature receiving device, a projector, or various measurement devices, such as devices for measuring water, electricity, gas, or electromagnetic waves. The electronic device may be one or a combination of the above-listed devices, and may be a flexible electronic device. The electronic device disclosed herein is not limited to the above-listed devices, and may include new electronic devices depending on the development of future technology.

Hereinafter, electronic devices are described with reference to the accompanying drawings, according to embodiments of the present disclosure. As used herein, the term "user" may refer to a human or an artificial intelligent electronic device using the electronic device.

FIG. 1 illustrates an electronic device 101 in a network environment 100 according to an embodiment of the present disclosure.

The electronic device 101 may include a bus 110, a processor 120, a memory 130, an input/output interface 150, a display 160, and a communication interface 170. In some embodiments, the electronic device 101 may exclude at least one of the components or may add another component.

The bus 110 may include a circuit for connecting the components 110 to 170 with one another and transferring communications, such as control messages and/or data, between the components.

The processor 120 may include one or more of a central processing unit (CPU), an application processor (AP), or a communication processor (CP). The processor 120 may perform control on at least one of the other components of the electronic device 101, and/or perform an operation or data processing relating to communication.

The memory 130 may include a volatile and/or non-volatile memory, and may store commands or data related to at least one other component of the electronic device 101, such as a program 140 including a kernel 141, middleware 143, an application programming interface (API) 145, and/or an application program (or applications) 147. At least a portion of the kernel 141, middleware 143, or API 145 may be denoted an operating system (OS).

For example, the kernel 141 may control or manage system resources, such as the bus 110, processor 120, or a memory 130, used to perform operations or functions implemented in other programs, such as the middleware 143, API 145, or applications 147. The kernel 141 may provide an interface that enables the middleware 143, the API 145, or at least one of the applications 147 to access the individual components of the electronic device 101 to control or manage the system resources.

The middleware 143 may function as a relay to enable the API 145 or the applications 147 to communicate data with the kernel 141, for example.

The middleware 143 may process one or more task requests received from the applications 147 in order of priority. For example, the middleware 143 may assign at least one of the applications 147 with priority of using system resources of at least one electronic device 101, and may perform scheduling or load balancing on the one or more task requests by processing the one or more task requests according to the priority assigned to at least one of the applications 147.

The API 145 enables at least one of the applications 147 to control functions provided from the kernel 141 or the middleware 143. For example, the API 145 may include at least one interface or function for filing, window, image processing, or text control.

The input/output interface 150 may transfer commands or data input from a user or other external devices to other component(s) of the electronic device 101, and may output commands or data received from other component(s) of the electronic device 101 to the user or the other external device.

The display 160 may include a liquid crystal display (LCD), a light emitting diode (LED) display, an organic light emitting diode (OLED) display, a microelectromechanical systems (MEMS) display, or an electronic paper display. The display 160 may display various content, such as text, images, videos, icons, or symbols, to the user, may include a touchscreen and may receive a touch, gesture, proximity or hovering input using an electronic pen or a body portion of the user.

For example, the communication interface 170 may set up communication between the electronic device 101 and an external device, such as a first electronic device 102, a second electronic device 104, or a server 106, may be connected with a network 162 through wireless communication or wired communication and may communicate with an external device, such as the second external electronic device 104 or server 106.

The wireless communication may use at least one of long term evolution (LTE), long term evolution-advanced (LTE-A), code division multiple access (CDMA), wideband code division multiple access (WCDMA), universal mobile telecommunication system (UMTS), wireless broadband (Wi-Bro), or global system for mobile communication (GSM), as a cellular communication protocol and short-range communication 164 including at least one of wireless fidelity (Wi-Fi), Bluetooth®, or near-field communication (NFC). The GNSS may include at least one of global positioning system (GPS), global navigation satellite system (Glonass), Beidou navigation satellite system (hereinafter, "Beidou") or Galileo, the European global satellite-based navigation system. The terms "GPS" and "GNSS" may be interchangeably used herein. The wired connection may include at least one of universal serial bus (USB), high definition multimedia interface (HDMI), recommended standard (RS)-232, or plain old telephone service (POTS). The network 162 may include at least one of communication networks a computer network, such as a local area network (LAN) or a wide area network (WAN), Internet, or a telephone network.

The first and second external electronic devices 102 and 104 each may be a device of the same or a different type from the electronic device 101. The server 106 may include a group of one or more servers. All or some of operations executed on the electronic device 101 may be executed on another or multiple other electronic devices.

According to an embodiment of the present disclosure, when the electronic device 101 should perform some function or service automatically or at a request, the electronic device 101, instead of executing the function or service on its own or additionally, may request another device to perform at least some functions associated therewith. The other electronic device may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used.

Figure 2:
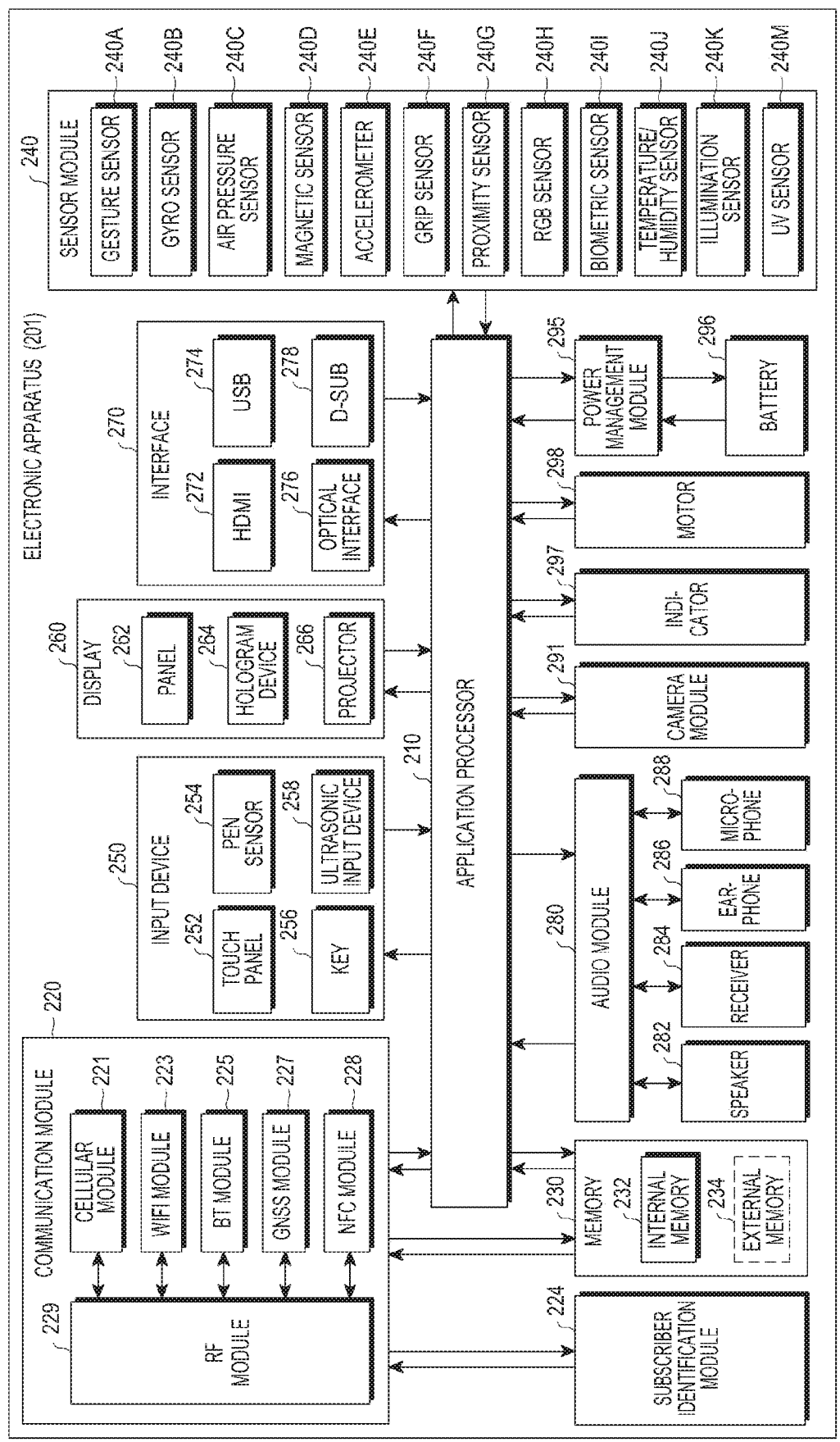
FIG. 2 illustrates an electronic device according to an embodiment of the present disclosure.

FIG. 2 illustrates an electronic device 201 according to an embodiment of the present disclosure.

The electronic device 201 may include all or part of the configuration of the electronic device 101 shown in FIG. 1. The electronic device 201 may include one or more processors, such as APs 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may control multiple hardware and software components connected to the processor 210 by running an OS or applications, may process and compute various data, and may be implemented in a system on chip (SoC). The processor 210 may further include a graphic processing unit (GPU) and/or an image signal processor, may include at least some of the components shown in FIG. 2, and may load a command or data received from at least one of other components, such as a non-volatile memory, on a volatile memory, process the command or data, and store various data in the non-volatile memory.

The communication module 220 may have the same or similar configuration to the communication interface 170 of FIG. 1 and may include a cellular module 221, a wireless fidelity (Wi-Fi) module 223, a Bluetooth (BT) module 225, a GNSS module 227, an NFC module 228, and an RF module 229.

The cellular module 221 may provide voice call, video call, text, or Internet services through a communication network, may perform identification or authentication on the electronic device 201 in the communication network using a subscriber identification module (SIM) card 224, may perform at least some of the functions provided by the processor 1010, and may include a CP.

The Wi-Fi module 223, the Bluetooth module 225, the GNSS module 227, or the NFC module 228 may include a process for processing data communicated through the module. According to an embodiment of the present disclosure, at least two of the cellular module 221, the Wi-Fi module 223, the Bluetooth module 225, the GNSS module 227, or the NFC module 228 may be included in a single integrated circuit (IC) or an IC package.

The RF module 229 may communicate signals, such as RF signals, and may include a transceiver, a power amp module (PAM), a frequency filter, a low noise amplifier (LNA), or an antenna. At least one of the cellular module 221, the Wi-Fi module 223, the BT module 225, the GNSS module 227, or the NFC module 228 may communicate RF signals through a separate RF module.

The SIM card 224 may include a card including a SIM and/or an embedded SIM, and may contain unique identification information, such as an integrated circuit card identifier (ICCID) or subscriber information, such as an international mobile subscriber identity (IMSI).

The memory 230 may include an internal memory 232 or an external memory 234. The internal memory 232 may include at least one of a volatile memory, such as a dynamic RAM (DRAM), a static RAM (SRAM), or a synchronous dynamic RAM (SDRAM), or a non-volatile memory, such as a one-time programmable ROM (OTPROM), a programmable ROM (PROM), an erasable and programmable ROM (EPROM), an electrically erasable and programmable ROM (EEPROM), a mask ROM, a flash ROM, a flash memory, such as a NAND flash, or a NOR flash, a hard drive, or solid state drive (SSD).

The external memory 234 may include a flash drive including a compact flash (CF) memory, a secure digital (SD) memory, a micro-SD memory, a min-SD memory, an extreme digital (xD) memory, a multi-media card (MMC), or a Memory Stick™. The external memory 234 may be functionally and/or physically connected with the electronic device 201 via various interfaces.

For example, the sensor module 240 may measure a physical quantity or detect a motion state of the electronic device 201, and may convert the measured or detected information into an electrical signal. The sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H, such as a red-green-blue (RGB) sensor, a bio sensor 240I, a temperature/humidity sensor 240J, an illumination sensor 240K, or an ultra violet (UV) sensor 240M. Additionally or alternatively, the sensing module 240 may include an e-nose sensor, an electromyography (EMG) sensor, an electroencephalogram (EEG) sensor, an electrocardiogram (ECG) sensor, an infrared (IR) sensor, an iris sensor, or a finger print sensor.

The sensor module 240 may further include a control circuit for controlling at least one or more of the sensors included in the sensing module. The electronic device 201 may further include a processor configured to control the sensor module 240 as part of the processor 210 or separately from the processor 210, and may control the sensor module 240 while the processor 210 is in a sleep mode.

The input unit 250 may include a touch panel 252, a (digital) pen sensor 254, a key 256, and an ultrasonic input device 258. The touch panel 252 may use at least one of capacitive, resistive, infrared, or ultrasonic methods, may further include a control circuit, and may further include a tactile layer and may provide a user with a tactile reaction.

The (digital) pen sensor 254 may include a part of a touch panel or a separate sheet for recognition. The key 256 may include a physical button, optical key or key pad. The ultrasonic input device 258 may sense an ultrasonic wave generated from an input tool through a microphone 288 to identify data corresponding to the sensed ultrasonic wave.

The display 260 may include a panel 262, a hologram device 264, or a projector 266. The panel 262 may have the same or similar configuration to the display 160 of FIG. 1, may be implemented to be flexible, transparent, or wearable, and may also be incorporated with the touch panel 252 in a module. The hologram device 264 may make three dimensional (3D) images (holograms) in the air by using light interference. The projector 266 may display an image by projecting light onto a screen. The screen may be located inside or outside of the electronic device 201. The display 260 may further include a control circuit to control the panel 262, the hologram device 264, or the projector 266.

The interface 270 may include a high definition multimedia interface (HDMI) 272, a USB 274, an optical interface 276, and a D-subminiature (D-sub) 278, may be included in the communication interface 170 shown in FIG. 1, and may include a mobile high-definition link (MHL) interface, an SD card/MMC interface, or an Infrared Data Association (IrDA) standard interface.

The audio module 280 may convert a sound signal into an electrical signal and vice versa. At least a part of the audio module 280 may be included in the input/output interface 145 as shown in FIG. 1. The audio module 280 may process sound information input or output through a speaker 282, a receiver 284, an earphone 286, or the microphone 288.

For example, the camera module 291 captures still images and videos, and may include one or more image sensors, such as front and back sensors, a lens, an image signal processor (ISP), and a flash such as an LED or xenon lamp.

The power manager module 295 may manage power of the electronic device 201, which may be powered by a battery, but is not limited thereto. According to an embodiment of the present disclosure, the power manager module 295 may include a power management Integrated circuit (PMIC), a charger IC, or a battery gauge. The PMIC may have a wired and/or wireless recharging scheme. The wireless charging scheme may include a magnetic resonance scheme, a magnetic induction scheme, or an electromagnetic wave based scheme, and an additional circuit, such as a coil loop, a resonance circuit, or a rectifier may be added for wireless charging. The battery gauge may measure an amount of remaining power of the battery 296, a voltage, a current, or a temperature while the battery 296 is being charged, and may include a rechargeable battery or a solar battery.

The indicator 297 may indicate a particular state of the electronic device 201 or a part of the electronic device, including a booting, message, or recharging state. The motor 298 may convert an electric signal to a mechanical vibration and may generate a vibrational or haptic effect. A processing unit for supporting mobile TV, such as a GPU may be included in the electronic device 201, and may process media data conforming to a standard for digital multimedia broadcasting (DMB), digital video broadcasting (DVB), or Mediaflo™.

Each of the aforementioned components of the electronic device may include one or more parts, and a name of the part may vary with a type of the electronic device. The electronic device in accordance with embodiments of the present disclosure may include at least one of the aforementioned components, omit some of them, or include other additional component(s). Some of the components may be combined into an entity, but the entity may perform the same functions as those performed by the components.

Figure 3:
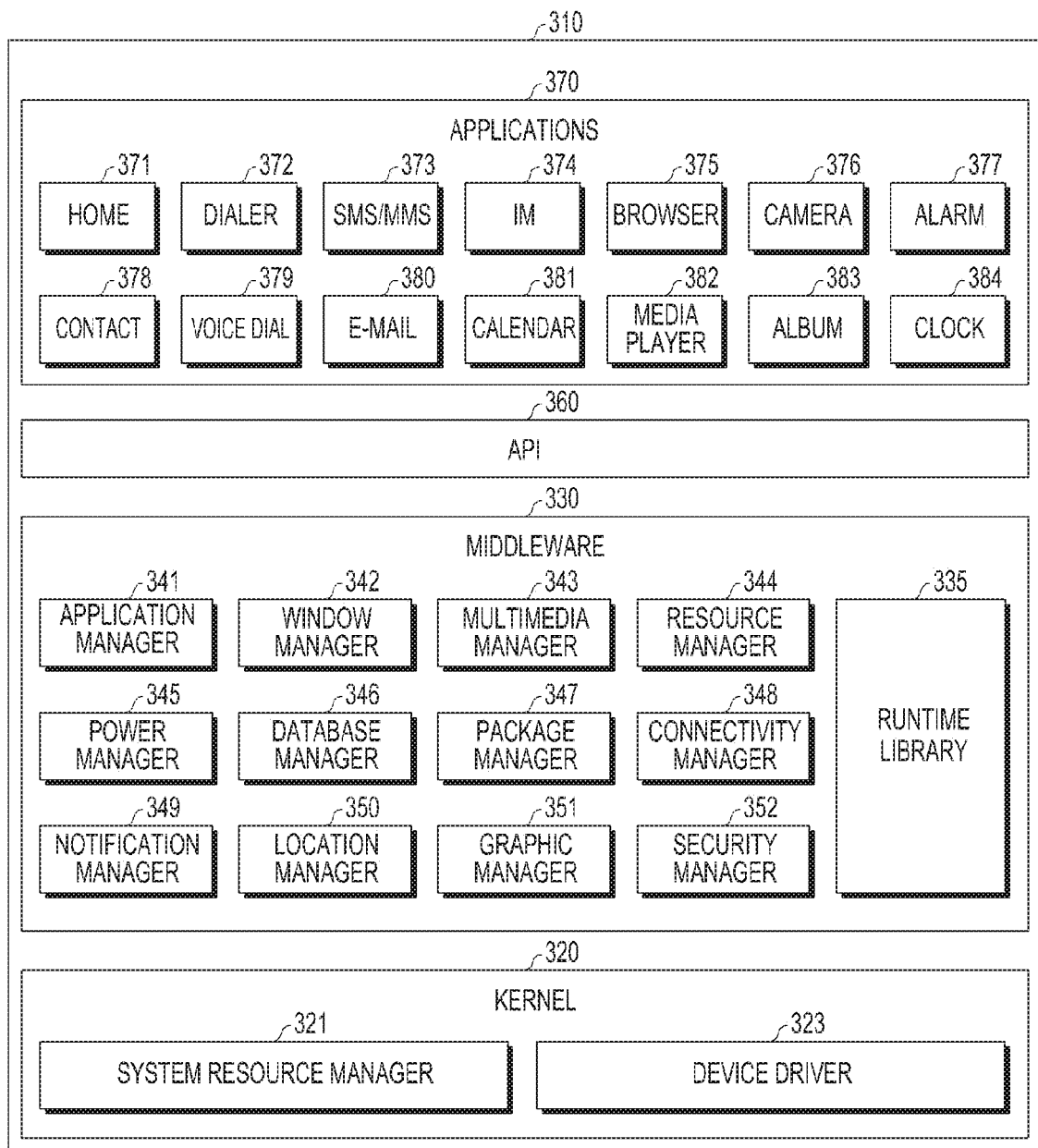
FIG. 3 illustrates a program module according to an embodiment of the present disclosure.

FIG. 3 illustrates a program module according to an embodiment of the present disclosure.

The program module 310 may include an OS controlling resources related to the electronic device and/or various applications driven on the operating system, which may include Android™, iOS™, Windows™, Symbian™, Tizen™, or Samsung Bada OS™.

The program module 310 may include a kernel 320, middleware 330, an API 360, and/or applications 370. At least a part of the program module 310 may be preloaded on the electronic device or may be downloaded from an external electronic.

The kernel 320 may include a system resource manager 321 and/or a device driver 323. The system resource manager 321 may perform control, allocation, or recovery of system resources, and may include a process managing unit, a memory managing unit, or a file system managing unit. The device driver 323 may include a display driver, a camera driver, a BT driver, a shared memory driver, a USB driver, a keypad driver, a Wi-Fi driver, an audio driver, or an inter-process communication (IPC) driver.

The middleware 330 may provide various functions to the applications 370 through the API 360 so that the applications 370 may efficiently use limited system resources in the electronic device or provide functions jointly required by the applications 370. According to an embodiment of the present disclosure, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module used by a compiler in order to add a new function through a programming language while at least one of the applications 370 is being executed, and may perform input/output management, memory management, or step on arithmetic functions.

The application manager 341 may manage the life cycle of at least one of the applications 370. The window manager 342 may manage GUI resources used on the screen. The multimedia manager 343 may grasp formats necessary to play various media files and use a codec appropriate for a format to perform encoding or decoding on media files. The resource manager 344 may manage resources, such as source code of at least one of the applications 370, memory or storage space.

The power manager 345 may operate together with a basic input/output system (BIOS) to manage battery or power and provide power information necessary for operating the electronic device. The database manager 346 may generate, search, or vary a database to be used in at least one of the applications 370. The package manager 347 may manage installation or update of an application that is distributed as a package file.

The connectivity manager 348 may manage wireless connectivity, such as Wi-Fi or Bluetooth. The notification manager 349 may display or notify an event, such as an incoming message, appointment, or proximity notification, of the user without interfering with the user. The location manager 350 may manage locational information on the electronic device. The graphic manager 351 may manage graphic effects to be offered to the user and their related user interface. The security manager 352 may provide various security functions necessary for system security or user authentication. When the electronic device has telephony capability, the middleware 330 may further include a telephony manager for managing voice call or video call functions of the electronic device.

The middleware 330 may include a middleware module forming a combination of various functions of the above-described components, may provide a specified module per type of the operating system in order to provide a differentiated function, and may dynamically omit some existing components or add new components.

The API 360 may be a set of API programming functions and may have different configurations depending on operating systems. For example, in the case of Android or iOS, one API set may be provided per platform, and in the case of Tizen, two or more API sets may be offered per platform.

The applications 370 may include a home 371, a dialer 372, a short message service (SMS)/multimedia messaging service (MMS) 373, an instant message (IM) 374, a browser 375, a camera 376, an alarm 377, a contact 378, a voice dial 379, an email 380, a calendar 381, a media player 382, an album 383, and a clock 384 application, as well as an application for health-care, such as measuring the degree of workout or blood sugar, or provision of environmental information, such as air pressure, moisture, or temperature information.

According to an embodiment of the present disclosure, the applications 370 may include an information exchanging application supporting information exchange between the electronic device and an external electronic device, such as a notification relay application for transferring specific information to the external electronic device, or a device management application for managing the external electronic device.

For example, the notification relay application may include a function for relaying notification information generated from other applications of the electronic device to the external electronic device, such as, may receive notification information from the external electronic device and may provide the received notification information to the user.

The device management application may perform at least some functions of the external electronic device communicating with the electronic device (for example, turning on/off the external electronic device or some components of the external electronic device, or control of brightness of the display), and the device management application may install, delete, or update an application operating in the external electronic device or a service provided from the external electronic device.

According to an embodiment of the present disclosure, the applications 370 may include a health-care application of a mobile medical device designated according to an attribute of the external electronic device, and may include an application received from the external electronic device and a preloaded application or a third party application downloadable from a server. The names of the components of the program module 310 may vary depending on the type of OS.

At least a part of the program module 310 may be implemented in software, firmware, hardware, or in a combination of two or more thereof, may be implemented by a processor, and may include a module, program, routine, set of commands, or process for performing one or more functions.

Figure 4A:
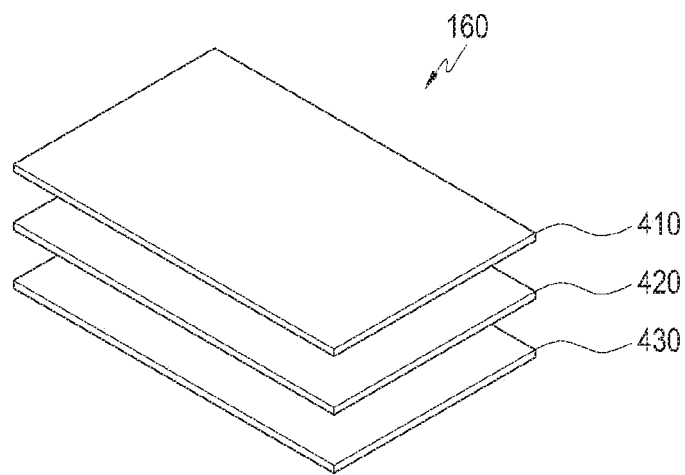
FIG. 4A illustrates a layered structure of a display according to an embodiment of the present disclosure.

FIG. 4A illustrates a layered structure of a display 160 according to an embodiment of the present disclosure.

Figure 4B:
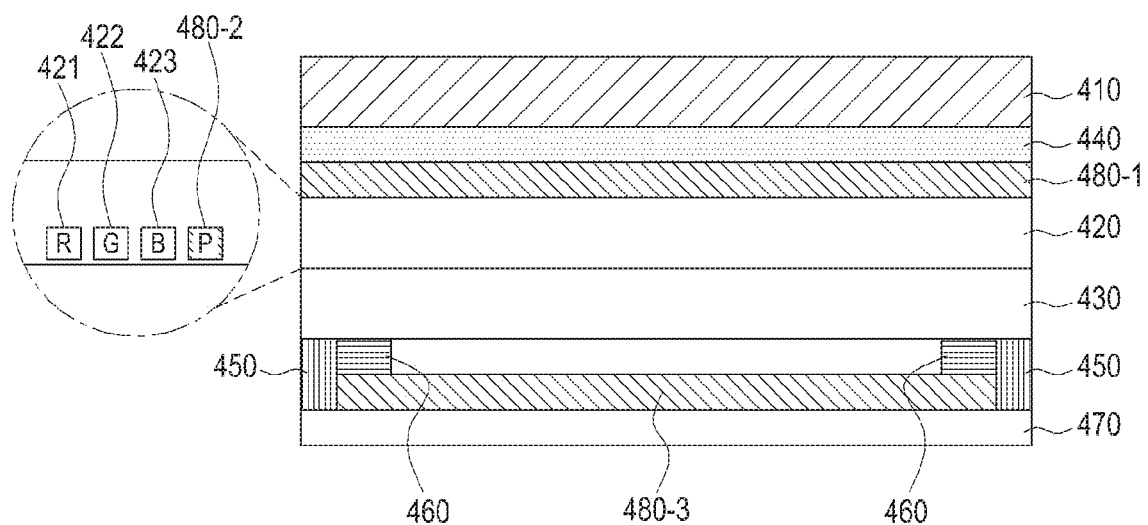
FIG. 4B illustrates a structure of a layered stack of a display according to an embodiment of the present disclosure.

FIG. 4B illustrates a layered stack of a display 160 according to an embodiment of the present disclosure.

Referring to FIGS. 4A and 4B, an electronic device 101 may include a display 160 including at least one sensor for sensing fingerprints, a memory 130, and a processor 120. The display 160 may include a protection cover 410, a touch panel 420 for sensing touches, a display panel 430 for displaying objects, and fingerprint sensors (or a fingerprint sensing panel) 480 and 480-1 to 480-3. The electronic device 101 may further include a panel for sensing pressure.

The protection cover 410 may be formed of plastic or glass to prevent the display from being damaged by impact applied thereto. The touch panel 420 may be a capacitive touch panel including a glass panel having both surfaces coated with conductive metal material, such as indium tin oxide (ITO), to enable electric current to flow therethrough and coated with dielectric material to store electric charges. When the surface of the touch panel 420 is touched by the user's finger, a predetermined number of electric charges are rendered to flow to the position of the touch by static electricity, and the touch panel 420 recognizes the variation in the electric current due to the movement of the electric charges, thereby sensing the position of the touch. The touch panel 420 may sense types of touches that can generate static electricity.

The display panel 430 may be an LCD or active matrix organic light emitting diode (AMOLED) panel, and may display a plurality of objects and various images according to services or execution of an application.

The fingerprint sensor 480 may be configured to correspond to the entire or partial region of the display 160, may include at least one sensor for sensing fingerprints, and may sense the user's fingerprints in an optical, capacitive, or ultrasonic wave scheme. The optical scheme may obtain the user's fingerprint by capturing the fingerprint into an image using a photosensitive diode. The capacitive scheme may obtain the user's finger based on the principle that a portion where a fingerprint contacts an electrode is sensed and a portion where a fingerprint does not contact an electrode is not sensed. The ultrasonic wave scheme may obtain the user's fingerprint based on the difference in path between reflections on the valley and ridge of the fingerprint of ultrasonic waves generated by a piezo device.

According to an embodiment of the present disclosure, the fingerprint sensor may be formed between an adhesive layer 440 and the touch panel 420, on a printed circuit board (PCB) 470, or inside the display panel 430. A plurality of fingerprint sensors may be jointly formed between the adhesive layer 440 and the touch panel location sensor 420, on the PCB 470, and inside the display panel 430. When the fingerprint sensor 480-1 is formed between the adhesive layer 440 and the touch panel 420, the fingerprint sensor 480-1 may be formed as a layer to correspond to the size of the display 160. The fingerprint sensor 480-2 may be formed in at least a portion of a surface of the display panel 430, where pixels, such as a red (R) pixel 421, a green (G) pixel 422, and a blue (B) pixel 423) are formed. The fingerprint sensor 480-3 may be formed on the PCB 470. At least one fingerprint sensor 480-1 to 480-3 may include an optical image sensor, an ultrasonic wave transceiver module, or a capacitive transceiver electrode pattern. The fingerprint sensor may include a plurality of conducting lines capable of recognizing the user's fingerprints.

In addition to the protection cover 410, the touch panel 420, the display panel 430, and at least one of the fingerprint sensors 480-1, 480-2 and 480-3, the display 160 may include the adhesive layer 440 for attaching the protection cover 410 to the fingerprint sensor 480-1, a structure 450 forming at least a portion of a sealing structure for protecting the fingerprint sensor 480-3, an elastic body 460 for mitigating impact to the display panel 430 or preventing influx of foreign objects, and the PCB 470.

According to the present disclosure, as described above, an electronic device 101 for sensing a fingerprint may include a display including at least one sensor for sensing the fingerprint, a memory, and at least one processor electrically connected with the display and the memory, wherein the processor may execute an application and display the application on the display, sense a first fingerprint inputted to at least one first region of the application displayed on the display, map the sensed first fingerprint to a function corresponding to the first region, determine whether the first fingerprint is sensed on the display, and apply the mapped function to the display to control screen.

The processor may store the first fingerprint mapped to a sub region corresponding to a function of the first region in the memory, and upon sensing the first fingerprint from an object displayed on the display, apply the mapped function to the object.

The processor may divide the application into the at least one first region for registering the fingerprint and a second region for displaying the at least one object and sensing the fingerprint inputted to the displayed object.

The processor may control the display to sense a fingerprint from a sub region corresponding to each function of the at least one first region.

When the number of the at least one first region is two or more, and the same fingerprint is inputted to the respective sub regions of the two or more first regions, the processor may map the inputted fingerprint to the functions of the first regions and store the mapping in the memory. Each of the sub regions may correspond to a respective one of functions of the two or more first regions.

When the number of the at least one first region is two or more, and different fingerprints are inputted to the respective sub regions of the two or more first regions, the processor may individually map the inputted different fingerprints to the functions of the first regions and store the mapping in the memory. Each of the sub regions may correspond to a respective one of functions of the two or more first regions.

Upon sensing a second fingerprint from the region where the first fingerprint has been sensed, the processor may update the function mapped to the first fingerprint with a function mapped to the second fingerprint.

A different fingerprint may be registered once for each of the at least one first region.

The screen control may vary depending on the function that the application provides.

When a menu item is selected from a menu provided by the displayed application, the processor may display a window corresponding to the selected menu item on the displayed application, and may apply the mapped function to the window to control a screen when the first fingerprint is sensed from the displayed window.

When a second application different from the executed application is selected, the processor may execute the second application, and may apply the function mapped to the first fingerprint to the object displayed on the second application when the first fingerprint is sensed from an object displayed on the second application.

Figure 5:
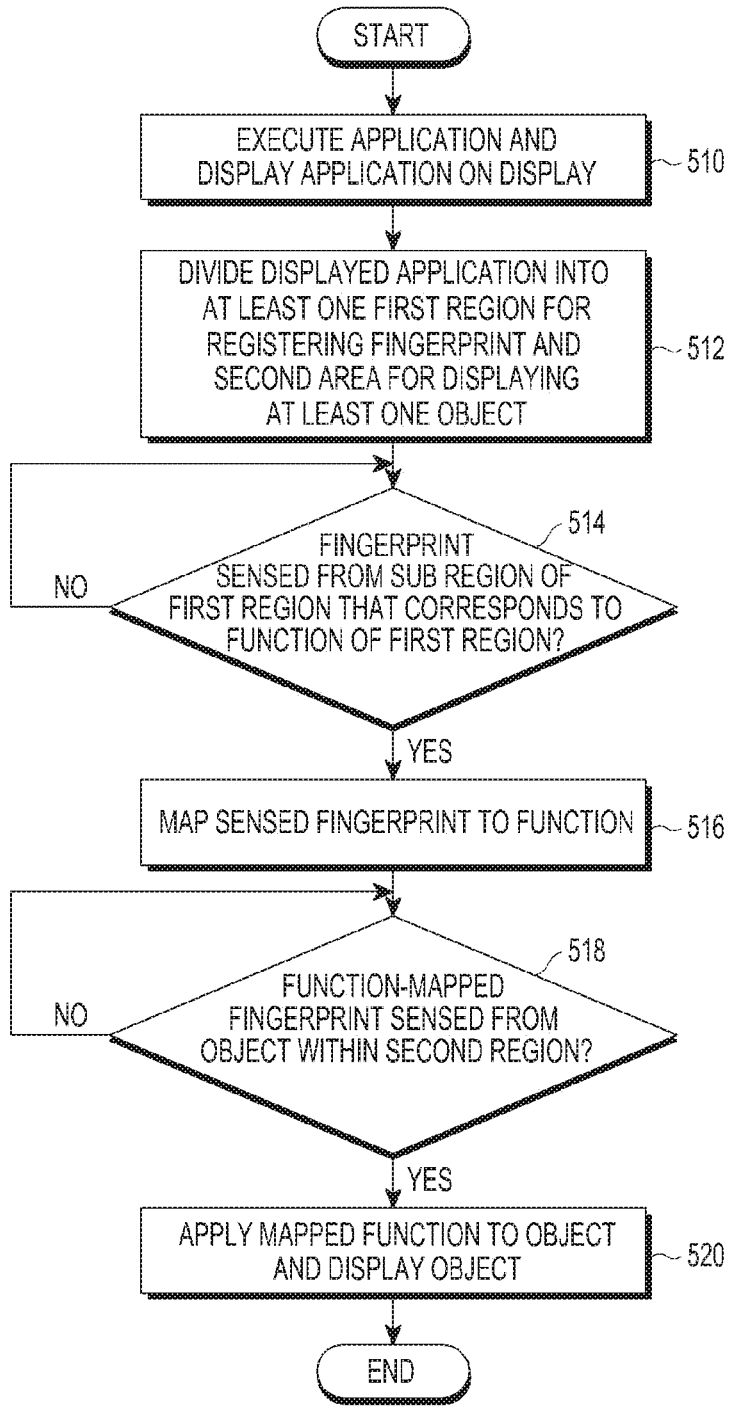
FIG. 5 illustrates a process for sensing a fingerprint to control screen by an electronic device according to an embodiment of the present disclosure.

FIG. 5 illustrates a process for sensing a fingerprint to control screen by an electronic device according to an embodiment of the present disclosure.

In step 510, an electronic device 101 may execute an application and display on the display. The electronic device 101 may display at least one application on the display 160, and may execute at least one application selected by a user and display the at least one application executed on the display 160. The at least one application may include at least one function including various functions that the application provides, and may be controlled by sensing the user's first folder. The screen controlled may be displayed on the display 160.

In step 512, the electronic device 101 may divide the displayed application into at least one first region for registering a fingerprint and a second region for displaying at least one object. The electronic device 101 may determine the first region including at least one function of the application and the region for displaying various objects that are displayed depending on the type of the application. The first region includes at least one function provided by the application, and the second region includes text, images, and videos. The electronic device 101 may divide the first region into at least two sub regions. When the same fingerprint is inputted to a sub region corresponding to the function included in each first region, the electronic device 101 may map the inputted fingerprint to the function included in each first region and temporarily store the mapping in the memory. When there are at least two first regions, and different fingerprints are inputted to the respective sub regions of the first regions, the electronic device 101 may map the inputted fingerprints to the respective functions of the first regions and temporarily store the mapping in the memory. Upon sensing, from a sub region where a first fingerprint is sensed, a second fingerprint different from the first fingerprint, the electronic device 101 may update the function mapped to the first fingerprint with the function mapped to the second fingerprint. One fingerprint may be registered for each first region.

When the same fingerprint is inputted to a sub region corresponding to the function included in each first region, the electronic device 101 may map the inputted fingerprint to the function included in each first region and temporarily store the mapping in the memory. The electronic device 101 may divide the first region into a plurality of sub regions depending on the type or purpose of the function that the application provides. For example, the first region may include one or more sub regions that may be differentiated from each other depending on the type or purpose of the function. When the application is capable of displaying at least one image, the application may provide the functions of deleting, sharing, and storing images or other functions.

In step 514, the electronic device 101 may determine whether a fingerprint is sensed from a sub region (of the first region) corresponding to the function of the at least one first region. When a fingerprint is sensed from the sub region, the method proceeds to step 516.

In step 514, the electronic device 101 may divide the application into at least one first region and a second region for displaying at least one object, and may set the at least one first region as a region for sensing a fingerprint. The electronic device 101 may also set the second region as a region for sensing a fingerprint. The electronic device 101 may set the entire area of the display 160 as a region for sensing a fingerprint. The width and length of the first region may vary depending on the number of functions that the application provides and the size of the sub region corresponding to the function. The position of display of the first region may vary under the control of the user. The electronic device 101 may set a sub region corresponding to each function of the first region, and may determine whether a function is inputted by setting the sub region corresponding to each function. When it is determined that the fingerprint is not sensed from the sub region, step 514 is repeated.

In step 516, the electronic device 101 may map the sensed fingerprint to the function. The electronic device may sense the user's fingerprint inputted to the sub region corresponding to at least one function included in at least one first region, and may sense the fingerprint of each finger of the user that is inputted to the sub region corresponding to each function. When the user's fingerprint is inputted to the sub region corresponding to the function within the first region, the electronic device 101 may map the inputted fingerprint to the function. When the user's fingerprint is inputted to the sub region corresponding to the function within the first region, the electronic device 101 may map the inputted fingerprint to the function and temporarily store the fingerprint in the memory 130. The electronic device 101 may store information about the function, the fingerprint, and mapped information to the memory 130. When the user's fingerprint is inputted to the sub region corresponding to each function within the first region, the electronic device 101 may map each inputted fingerprint to a corresponding function.

In step 518, the electronic device 101 may determine whether the fingerprint mapped to the function is sensed from an object within the second region. The electronic device 101 may determine whether the same fingerprint, such as from the same finger, as the fingerprint mapped to the function is sensed. Upon sensing a fingerprint from the sub region corresponding to the function, the electronic device 101 may store information about the function, the fingerprint, and mapped information to the memory 130. The electronic device 101 may determine whether the fingerprint mapped to the function is sensed from an object within the second region, and may compare a pre-stored fingerprint with the fingerprint sensed from the object within the second region to determine whether both match each other. When it is determined that the fingerprint mapped to the function is sensed from an object within the second region, the method proceeds to step 520. If not, step 518 is repeated.

In step 520, the electronic device 101 may apply the mapped function to the object from which the fingerprint has been sensed and display the object. When the fingerprint sensed from the object within the second region matches the pre-stored fingerprint, such as when the fingerprints are from the same finger, the electronic device 101 may apply the function mapped to the pre-stored fingerprint to the object from which the fingerprint has been sensed. For example, when the function is a delete function, and the fingerprint is from the user's index finger, the electronic device 101 may sense an input of the fingerprint of the index finger to the sub region corresponding to the delete function of the first region and map the sensed fingerprint to the delete function.

Upon sensing the fingerprint of the index finger from the region corresponding to at least one of at least one object displayed on the second region, the electronic device 101 may determine whether the fingerprint of the index finger inputted to the first region is the same as the fingerprint of the index finger sensed from the region corresponding to the at least one object, and when the two fingerprints are the same, the electronic device 101 may delete the at least one object. The electronic device 101 may control the display 160 so that the at least one object disappears from the display 160.

The electronic device 101 may sense whether a menu item is selected from a menu that the executed application provides. When a menu item is selected from the menu that the executed application provides, the electronic device 101 may display a window corresponding to the selected menu item on the executed application. Upon sensing the first fingerprint on the displayed window, the electronic device 101 may apply the mapped function to the window, controlling the screen, may display the controlled screen on the display 160, may sense whether another application different from the executed application is selected, may execute the other selected application, and may determine whether the first fingerprint is sensed from an object displayed on the other application. Upon sensing the first fingerprint from the object displayed on the other application, the electronic device 101 may apply the function mapped to the first fingerprint to the object displayed on the other application, controlling the screen.

FIGS. 6A, 6B, 6C and 6D illustrate a process for controlling screen corresponding to a fingerprint inputted while an electronic device displays an application according to an embodiment of the present disclosure. FIG. 6A illustrates when an electronic device displays an application on a display, FIG. 6B illustrates when an input is made by an index finger to a sub region corresponding to a function of a first region of the displayed application, FIG. 6C illustrates when an input is made by the index finger to an object to which the function is to be applied, and FIG. 6D illustrates when the screen is controlled corresponding to the index finger that has made the input to the object, according to embodiments of the present disclosure.

Referring to FIG. 6A, the electronic device 101 may execute an application and display the application on the display 160. For example, the electronic device 101 may display a list of text messages and an application that may display the content of a text message selected from the list. The electronic device 101 may divide the application into at least one first region 610 for registering fingerprints and a second region 620 for displaying at least one object and sensing a fingerprint inputted to the object. The electronic device 101 may display the application divided into the first region and the second region. The first region 610 may include at least one function depending on the type or purpose of the displayed application. For example, when the application is to display the list or content of text messages, the electronic device 101 may divide the application into the first region 610 including various functions that the application provides such as a "delete" function 611 to delete a message, a "share" function 612 to share a message, and a "save" function 613 to save a message, and the second region 623 including a list of at least one message, such as 621, 622, 623, 624, 625, and 626.

Referring to FIG. 6B, upon sensing a fingerprint of an index finger 630 from a sub region corresponding to a first function of the first region 610, such as "delete" 611, while displaying, on the display 160, an application including the first region 610 including various functions, such as "delete" 611, "share" 612, and "save" 613, and a second region 620 including a list of at least one message, such as 621, 622, 623, 624, 625, and 626, the electronic device 101 may map the fingerprint of the index finger 630 to the first function "delete" 611 and store the result in the memory 130. The electronic device 101 may map the fingerprint of the index finger 630 to the first function, such as "delete" 611 and temporarily store a resultant value of the mapping, such as a command for the first function 611 or fingerprint information about the index finger, in the memory 130.

Referring to FIG. 6C, the user may select at least one text message from the message list 621, 622, 623, 624, 625, and 626 displayed on the second region 620. The electronic device 101 may sense the fingerprint of the user's index finger 630 that is inputted to select the text message. Upon sensing the fingerprint of the index finger 630 on the sub region corresponding to the text message 623 of the second region, the electronic device 101 may determine whether the sensed fingerprint is the same as the inputted fingerprint of FIG. 6B. If the same, the electronic device 101 may control the screen of the display 160 to delete the text message selected by the index finger 630 from the text message list on the display 160.

Referring to FIG. 6D, when the text message selected by the index finger 630 is deleted from the text message list, the electronic device 101 may update the screen of the display 160 so that the deleted text message disappears. The electronic device 101 may display a message list 621, 622, 624, 625, and 626 that does not include the message deleted form the message list, such as 621, 622, 623, 624, 625, and 626 in FIG. 6C.

FIGS. 7A, 7B, 7C and 7D illustrate a process for controlling screen corresponding to a fingerprint inputted while an electronic device displays an application according to embodiments of the present disclosure. FIG. 7A illustrates when an electronic device displays an application on a display, FIG. 7B illustrates when an input is made by an index finger to a sub region corresponding to a function of a first region of the displayed application, FIG. 7C illustrates when an input is made by the index finger to an object to which the function is to be applied, and FIG. 7D illustrates when the screen is controlled corresponding to the index finger that has made the input to the object, according to embodiments of the present disclosure.

Referring to FIG. 7A, the electronic device 101 may execute an application and display the application on the display 160. For example, the electronic device 101 may display an application that displays at least one image, may divide the application into at least one first region 710 for registering fingerprints and a second region 720 for displaying at least one object and sensing a fingerprint inputted to the object, and may display the application divided into the first region 710 and the second region 720. The first region 710 may include at least one function depending on the type or purpose of the displayed application. For example, when the application is to display at least one image, the electronic device 101 may divide the application into the first region 710 including various functions that the application provides such as a "delete" function 711 to delete an image, a "copy" function 712 to copy an image, and a "move" function 713 to move an image, and the second region 720 including at least one image, such as 720-1, 720-2, . . . 720-n.

Referring to FIG. 7B, upon sensing a fingerprint of an index finger 730 from a sub region corresponding to a first function "delete" 711 of the first region 710 while displaying, on the display 160, the application including the first region 710 including various functions, such as "delete" 711, "copy" 712, and "move" 713, and the second region 720 including at least one image, such as 720-1, 720-2, . . . 720-n, the electronic device may map the fingerprint of the index finger 730 to the first function "delete" 711 and store the result in the memory 130. The electronic device 101 may map the fingerprint of the index finger 730 to the first function "delete" 711 and temporarily store a resultant value, such as a command for the first function 711 or fingerprint information about the index finger (or a fingerprint image) of the mapping in the memory 130.

Referring to FIG. 7C, the user may select at least one image from among the at least one image, such as 720-1, 720-2, . . . 720-n, displayed on the second region 720, and may sense the fingerprint of the user's index finger 730 that is inputted to select at least one image. Upon sensing the fingerprint of the index finger 730 on the sub region corresponding to the image, such as 720-3 of the second region as illustrated, the electronic device 101 may determine whether the sensed fingerprint is the same as the inputted fingerprint of FIG. 7B. If the same, the electronic device may control the screen of the display 160 to delete the image selected by the index finger 730 from the plurality of images on the display 160.

Referring to FIG. 7D, when the image selected by the index finger 630 is deleted from the plurality of images, the electronic device 101 may update the screen of the display 160 so that the deleted image disappears.

Figure 8A:
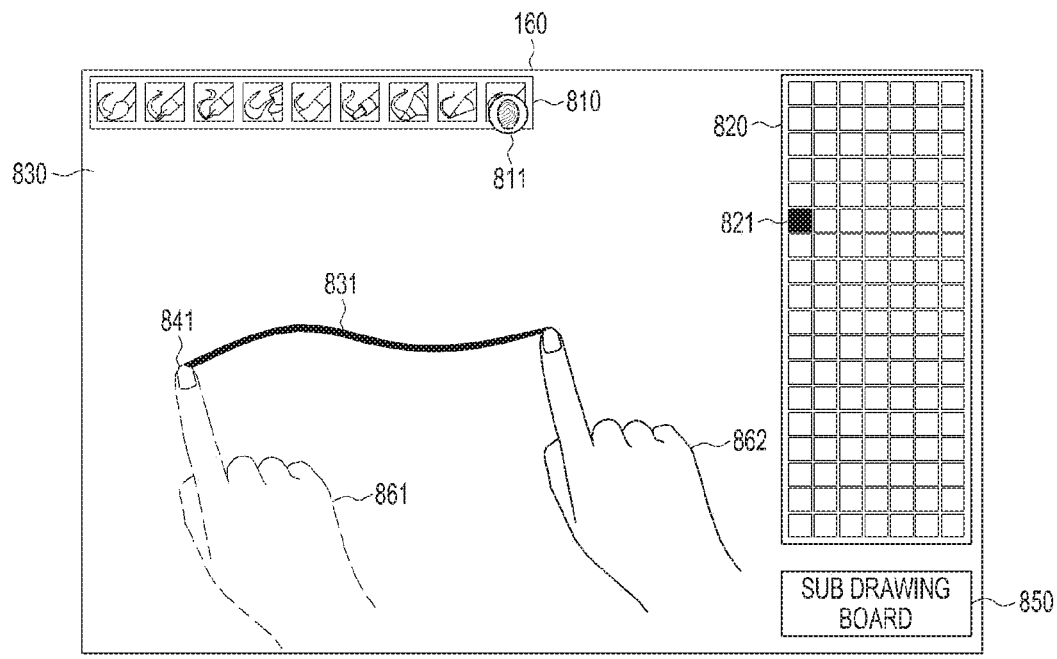
FIGS. 8A, 8B, 8C and 8D illustrate a process for drawing a picture corresponding to a fingerprint inputted while an electronic device displays a drawing application according to an embodiment of the present disclosure.
Figure 8B:
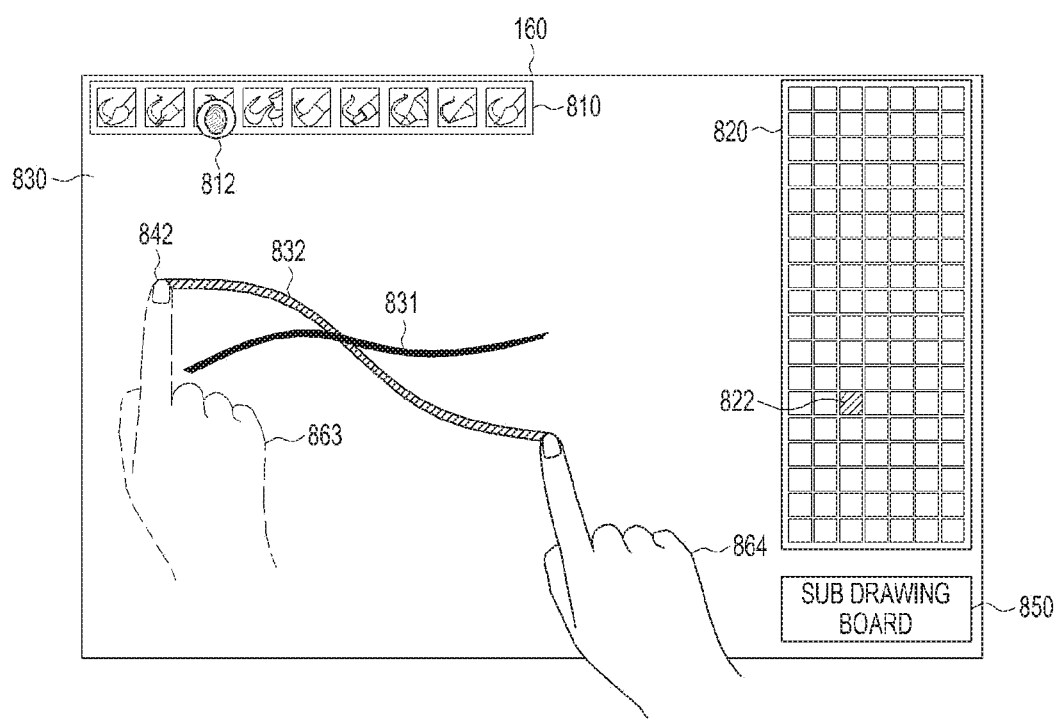
Figure 8C:
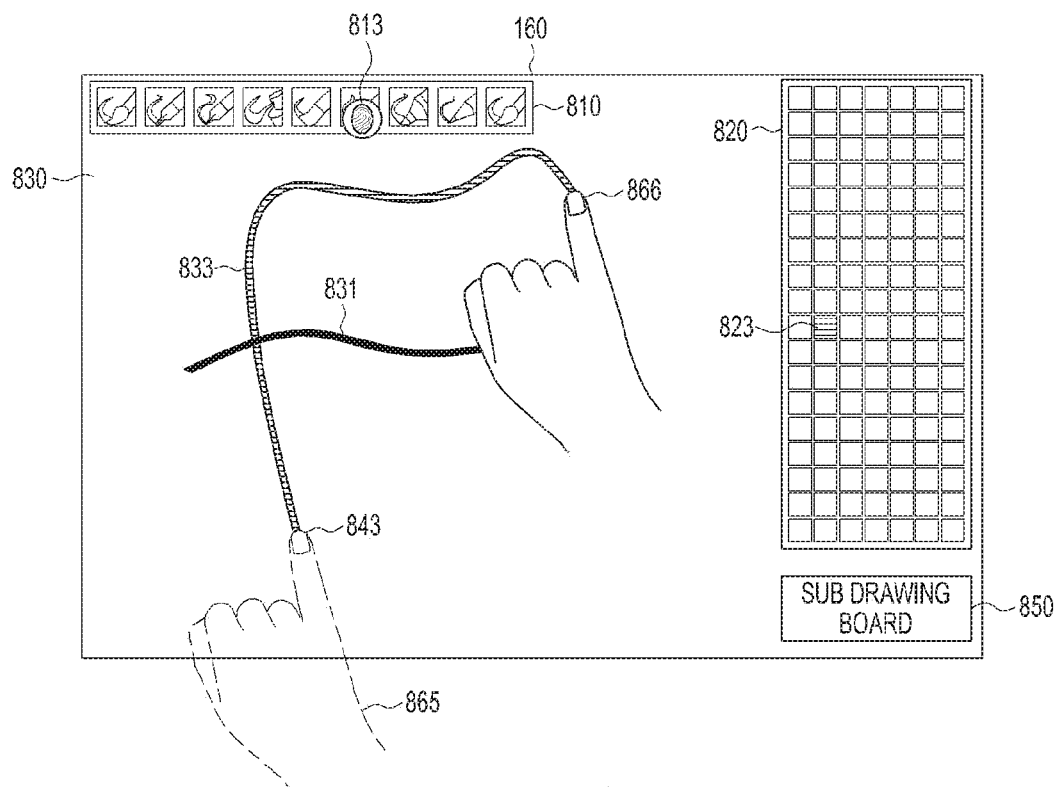
Figure 8D:
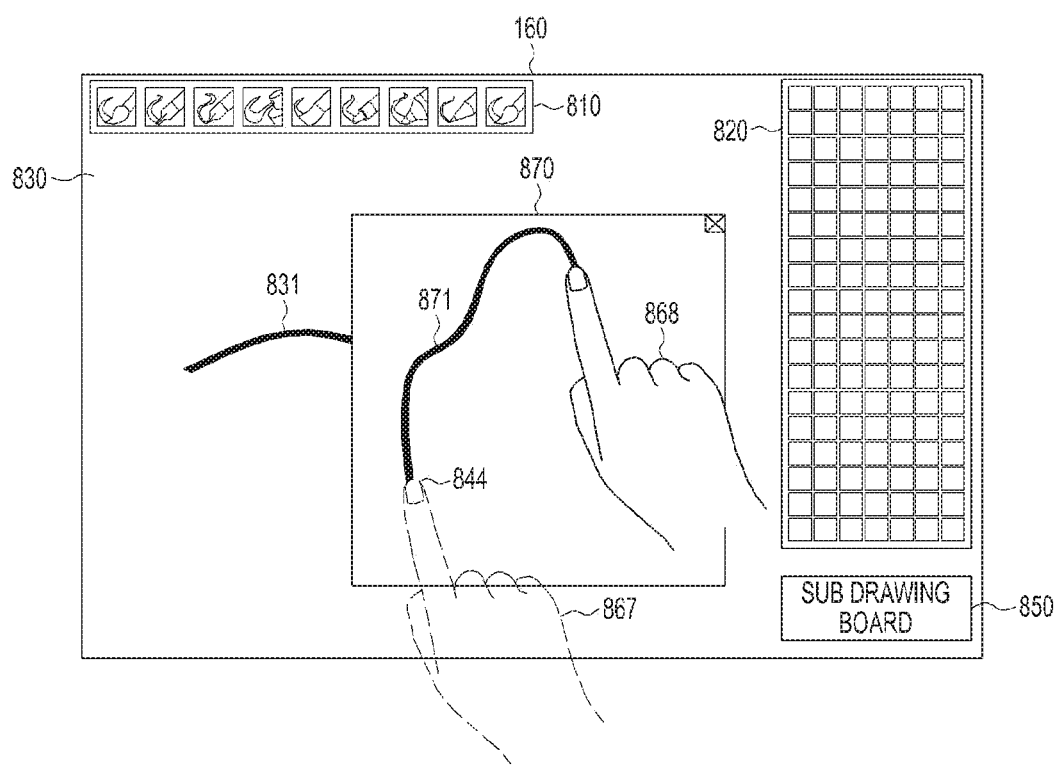

FIGS. 8A, 8B, 8C and 8D illustrate a process for drawing a picture corresponding to a fingerprint inputted while an electronic device displays a drawing application according to embodiments of the present disclosure. FIG. 8A illustrates when an electronic device divides an application into two first regions and a second region and displays a first stroke using a fingerprint of a first finger on each first region, FIG. 8B illustrates when the electronic device displays a second stroke using a fingerprint of the first finger on each first region with the first stroke remaining displayed, FIG. 8C illustrates when the electronic device displays a third stroke using a fingerprint of a second fingerprint on each first region with the first and second stroke remaining displayed, and FIG. 8D illustrates when the electronic device displays a window corresponding to a selection from a menu provided by the application, according to embodiments of the present disclosure.

Referring to FIG. 8A, the electronic device 101 may execute an application that provides a drawing function and display the application on the display 160, may divide the application into at least one first region 810 and 820 for registering fingerprints and a second region 830 for displaying strokes depending on the order or direction of inputs, may display the application that is divided into two first regions 810 and 820 and the second region 830, and may also display a menu 850, i.e., a sub drawing board, that the application provides. The two first regions 810 and 820 may include at least one function depending on the type or purpose of the displayed application. For example, when the application provides a drawing function, the electronic device 101 may display the first regions including a region 810 for selecting the type or thickness of a line or a drawing tool, a region 820 for selecting one from among various colors and the second region for displaying strokes that the user inputs.

When the user uses his or her index finger 841 to touch a sub region (of the first region) corresponding to a first function 811 among various functions for selecting the type or thickness of a line or a drawing tool and to select a first color 821 from the region 820 that displays various colors, the electronic device 101 may obtain the fingerprints corresponding to the inputs to the first function 811 and the first color 821. Corresponding to the user's inputs, the electronic device 101 may determine that the user intends to draw a stroke according to the first function and the first color, and may map the fingerprint of the index finger 841 to the result of the determination. For example, when the user selects the first function 811 and the first color 821 and then makes a stroke from a first position 861 to a second position 862, the electronic device 101 may display a stroke 831 along the direction of the movement of the index finger 841.

Referring to FIG. 8B, when the user uses his or her index finger 842 to touch a sub region (of the first region) corresponding to a second function 812 among various functions for selecting the type or thickness of a line or a drawing tool and to select a second color 822 from the region 820 that displays various colors while the first stroke 831 of FIG. 8A is being displayed, the electronic device 101 may obtain the fingerprints corresponding to the inputs to the second function 812 and the second color 822. Corresponding to the user's inputs, the electronic device 101 may determine that the user intends to draw a stroke according to the second function and the second color, the electronic device 101 may map the fingerprint of the index finger 842 to the result of the determination. For example, when the user selects the second function 812 and the second color 822 and then makes a stroke from a third position 863 to a fourth position 864, the electronic device 101 may display a second stroke 832 along the direction of the movement of the index finger 842.

Referring to FIG. 8C, when the user uses a pinky finger 843 to touch a sub region (of the first region) corresponding to a third function 813 among various functions for selecting the type or thickness of a line or a drawing tool and to select a third color 823 from the region 820 that displays various colors while the first and second stroke 831 of FIG. 8B are being displayed, the electronic device 101 may obtain the fingerprints corresponding to the inputs to the third function 813 and the third color 823. Corresponding to the user's inputs, the electronic device 101 may determine that the user intends to draw a stroke according to the third function and the third color, and may map the fingerprint of the pinky finger 843 to the result of the determination. For example, when the user selects the third function 813 and the third color 823 and then makes a stroke from a fifth position 865 to a sixth position 866, the electronic device 101 may display a third stroke 833 along the direction of the movement of the pinky finger 843.

Referring to FIG. 8D, when the user selects a sub drawing board 850 with the first stroke 831 of FIG. 8A remaining displayed, the electronic device 101 may display a sub window 870 for drawing. When the user uses his or her index finger 844 to make a stroke from a seventh position 867 to an eighth position 868 with the window 870 remaining displayed, the electronic device 101 may display a stroke 871 along the direction in which the user's index finger 844 moves, and may perform the same function or operation on the same application using the information mapped to the fingerprint. For example, when the user selects the first function 811 and the first color 821 and then makes a stroke from a first position 861 to a second position 862 as shown in FIG. 8A, the electronic device 101 may display a stroke 831 along the direction of the movement of the index finger 841. When the user makes a stroke from the seventh position 867 to the eighth position 868 on the window 870, the electronic device 101 may display a stroke 871 along the direction of the movement of the index finger 844 with the same function as that of FIG. 8A.

Figure 9:
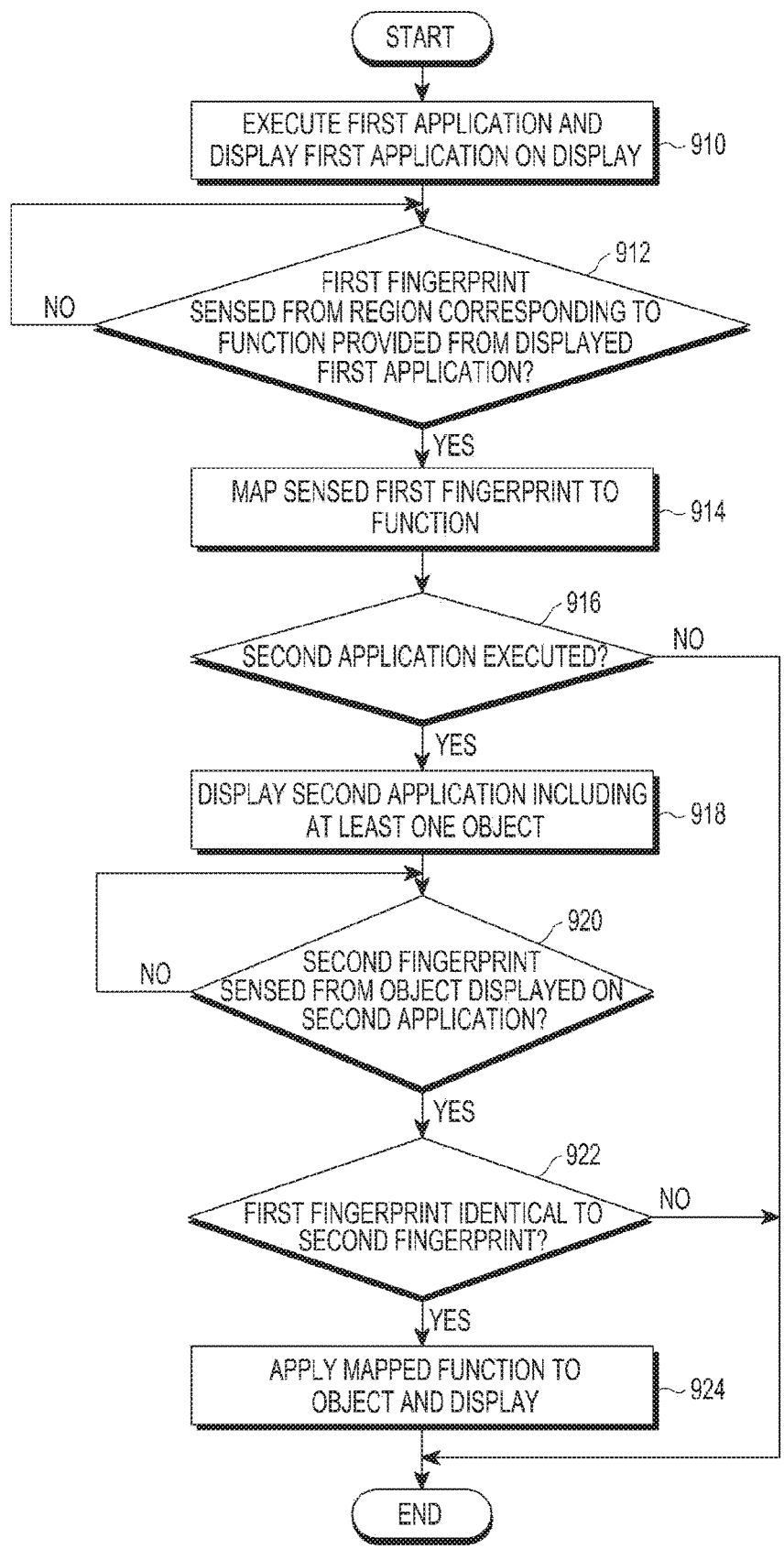
FIG. 9 illustrates a process for sensing a fingerprint to control screen by an electronic device according to an embodiment of the present disclosure.

FIG. 9 illustrates a process for sensing a fingerprint to control screen by an electronic device according to an embodiment of the present disclosure.

In step 910, an electronic device 101 may execute an application and display on the display. The electronic device 101 may execute an application and display on the display, may display at least one application on the display 160, and may execute at least one application selected by a user and display the at least one application executed on the display 160. The at least one application may include at least one function. The at least one function may include various functions that the application provides, and may be controlled by sensing the user's first folder. The screen controlled may be displayed on the display 160.

In step 912, the electronic device 101 may determine whether a first fingerprint is sensed from a region corresponding to a function that a first displayed application provides. If the first fingerprint is sensed from the corresponding region, the method proceeds to step 914. If not, step 912 is repeated. In particular, the electronic device 101 may determine a first region including at least one function of the executed application and a second region for displaying various objects that are displayed depending on the type of the application. The first region includes at least one function provided by the application, and the second region includes various text, images, and videos. The electronic device 101 may set a sub region (of the first region) corresponding to each function of the first region. The electronic device 101 may determine whether a function is inputted by setting the function-corresponding region, may sense a fingerprint inputted to the set region, may sense the user's fingerprint inputted to the region of at least one function included in at least one first region, and may sense the fingerprint of each finger of the user that is inputted to the region of each function.

In step 914, the electronic device 101 may map the sensed first fingerprint to the function. When the user's fingerprint is inputted to the region of the function within the first region, the electronic device 101 may map the inputted fingerprint to the function. When the user's fingerprint is inputted to the region of the function within the first region, the electronic device 101 may map the inputted fingerprint to the function and temporarily store the fingerprint in the memory 130. The electronic device 101 may store information about the function, the fingerprint, and mapped information to the memory 130. When the user's fingerprint is inputted to the region of each function within the first region, the electronic device 101 may map each inputted fingerprint to a corresponding function. Upon sensing, from a sub region where a first fingerprint is sensed, a second fingerprint different from the first fingerprint, the electronic device 101 may update the function mapped by the first fingerprint with the function mapped with the second fingerprint. One fingerprint may be registered for each first region. The second fingerprint is a fingerprint of the same finger with the first fingerprint.

In step 916, the electronic device 101 may determine whether a second application is executed. If the second application is executed, the method proceeds to step 918. If not, the method ends. In particular, the electronic device 101 may execute and display the second application with the first application remaining displayed on the display 160. The first and second application) may be the same or different from each other, may include at least one function, and may include a different function depending on its type or purpose. The at least one function may include various functions that the application provides, and may be controlled by sensing the user's first folder. The screen controlled may be displayed on the display 160.

In step 918, the electronic device 101 may display the second application including at least one object on the display 160, and may execute and display, on the display 160, the second application which differs from the first application, while executing the first application selected by the user. The second application may determine a third region including at least one function that is executed by the second application and a fourth region displaying various objects depending on the type of the application. The third region includes at least one function provided by the application, and the fourth region includes various text, images, and videos. For example, when the second application is an application for displaying images, the at least one object may include various pictures, images, or paintings. The second application may be controlled by sensing the user's first folder.

The screen controlled may be displayed on the display 160. The electronic device 101 may set a sub region corresponding to each function of the third region, may determine whether a function is inputted by setting the function-corresponding region, may sense a fingerprint inputted to the set region, may sense the user's fingerprint inputted to the sub region corresponding to at least one function of the at least one third region, and may sense the fingerprint of each finger of the user that is inputted to the region of each function.

In step 920, the electronic device 101 may determine whether the second fingerprint is sensed from the object displayed on the displayed second application. If the second fingerprint is sensed from the object on the displayed second application, the method proceeds to step 922. If not, step 920 is repeated. In particular, the electronic device 101 may sense the second fingerprint inputted to the fourth region, may sense the user's second fingerprint inputted to the sub region corresponding to at least one object included in at least one fourth region, may sense the fingerprint of each finger of the user that is inputted to the region corresponding to each object, and may sense the second fingerprint inputted to the region corresponding to the at least one object included in the second region of the second application while the first fingerprint is sensed from the region corresponding to the function of the first region of the first application and temporarily stored in the memory 130.

In step 922, the electronic device 101 may determine whether the first fingerprint is the same as the second fingerprint. If the first and second fingerprints are the same, the method proceeds to step 924. If not, the method ends. In particular, the electronic device 101 may determine whether the first fingerprint of the finger (e.g., point finger) sensed in step 912 is the same as the second fingerprint of the finger (e.g., point finger) sensed in step 920. If the first fingerprint and the second fingerprint are fingerprints with the same finger, the electronic device 101 may extract the function mapped to the first fingerprint from the memory 130.

In step 924, the electronic device 101 may apply the function mapped to the first fingerprint to the object from which the second fingerprint has been sensed and display the object. When the first fingerprint sensed in step 912 is determined to be the same as the second fingerprint sensed in step 920, the electronic device 101 may apply the function mapped to the first fingerprint to the object from which the second fingerprint has been sensed and control the screen. When the sensed second fingerprint is determined to be the same as the first fingerprint, the electronic device 101 may use the function mapped to the first fingerprint. Thus, the electronic device 101 may abstain from performing the mapping step using the second fingerprint.

When the first fingerprint of the finger (e.g., point finger) sensed from the region corresponding to the first function of the first application is the same as the second fingerprint of the finger (e.g., point finger) sensed from the region corresponding to the object displayed on the second region of the second application, such as when the fingerprints are from the same finger, the electronic device 101 may apply the function mapped to the first fingerprint to the object from which the fingerprint has been sensed. For example, when the first function is a "delete" function, the first fingerprint is one from an index finger, and a fingerprint of the index finger is sensed from the region corresponding to at least one object displayed on the second region of the second application, the electronic device 101 may determine whether the fingerprint of the index finger mapped to the first function is the same as the fingerprint of the index finger sensed from the region corresponding to the at least one object displayed on the second region. When the two fingerprints are the same, the electronic device 101 may apply the first function to the at least one object displayed on the second region, deleting the at least one object, and may control the display 160 so that the at least one object disappears from the display 160.

According to embodiments of the present disclosure, as previously described, a method for sensing a fingerprint through a display including at least one sensor for sensing the fingerprint in an electronic device including the display, a memory, and a processor may comprise executing an application and displaying the application on the display, sensing a first fingerprint inputted to at least one first region of the application displayed on the display, mapping the sensed first fingerprint to a function corresponding to the first region, determining whether the first fingerprint is sensed on the display, and applying the mapped function to the display and displaying the application.

The method may further include storing the first fingerprint mapped to the function corresponding to the first region and upon sensing the first fingerprint from an object displayed on the display, applying the mapped function to the object.

The method may further include dividing the application into the at least one first region for registering the fingerprint and a second region for displaying the at least one object and sensing the fingerprint inputted to the displayed object.

The method may further include controlling the display to sense the fingerprint from a sub region corresponding to each function of the at least one first region.

The method may further include, when the number of the at least one first region is two or more, receiving the same fingerprint from the respective sub regions of the two or more first regions and mapping the inputted fingerprint to a function included in each of the two or more first regions. Here, each of the sub regions may correspond to a respective one of functions of the two or more first regions.

The method may further include, when the number of the at least one first region is two or more, receiving different fingerprints from the respective sub regions of the two or more first regions and mapping the inputted different fingerprints to the functions included in the two or more first regions. Here, each of the sub regions may correspond to a respective one of functions of the two or more first regions.

The method may further include, upon sensing a second fingerprint from the region where the first fingerprint has been sensed, updating the function mapped to the first fingerprint with a function mapped to the second fingerprint.

A different fingerprint may be registered once for each of the at least one first region.

The method may further include, when a menu item is selected from a menu provided by the displayed application, displaying a window corresponding to the selected menu item on the displayed application, and when the first fingerprint is sensed from the displayed window, applying the mapped function to the window to control a screen.

The method may further include, when a second application different from the executed application is selected, executing the second application, and when the first fingerprint is sensed from an object displayed on the second application, applying the function mapped to the first fingerprint to the object displayed on the second application.

The function mapped to the first fingerprint may be a function jointly provided by the executed application and the second application.

Figure 10:
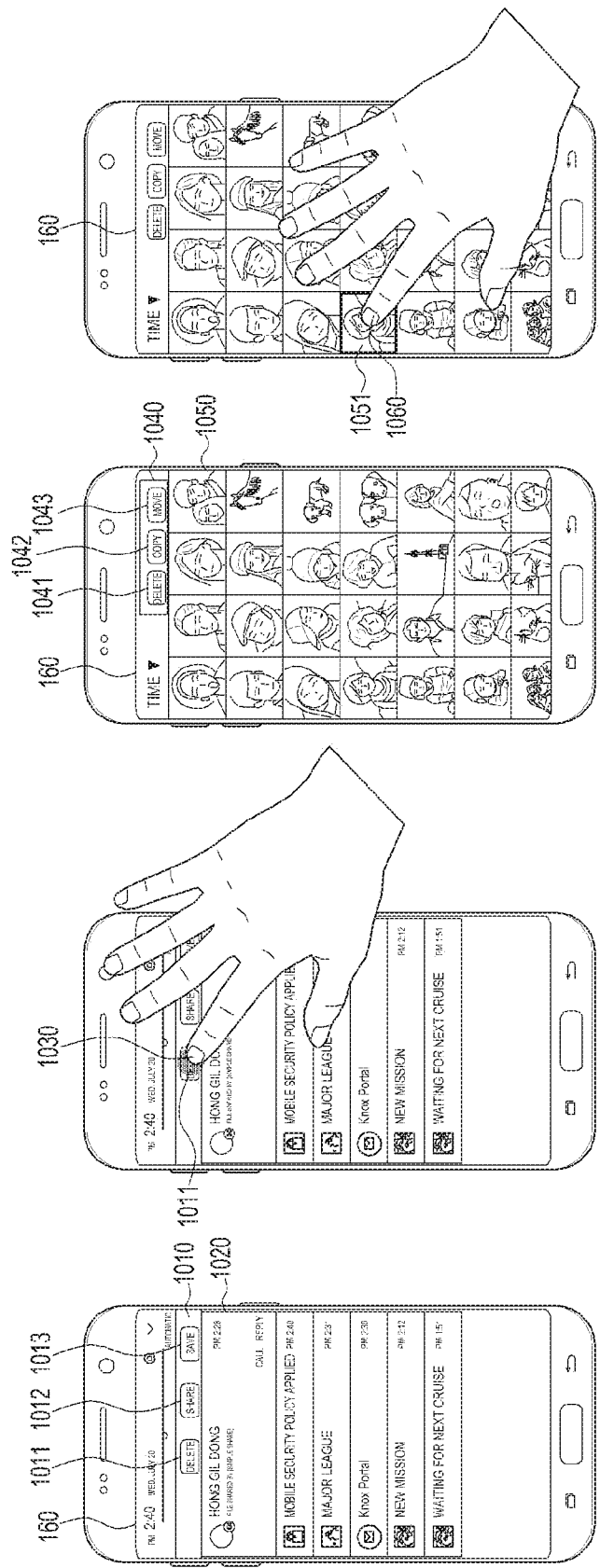
FIGS. 10A, 10B, 10C and 10D illustrate a process for controlling a second application corresponding to a fingerprint inputted while an electronic device displays a first application according to an embodiment of the present disclosure.

FIGS. 10A, 10B, 10C and 10D illustrate a process for controlling a second application corresponding to a fingerprint inputted while an electronic device displays a first application, according to embodiments of the present disclosure. FIG. 10A illustrates when an electronic device displays a first application on a display, FIG. 10B illustrates when an input is made by an index finger to a sub region corresponding to a function of a first region of the displayed first application, FIG. 10C illustrates when the electronic device displays a second application, and FIG. 10D illustrates when an input is made by an index finger to an object displayed on the second application, according to embodiments of the present disclosure.

Referring to FIG. 10A, the electronic device 101 may execute a first application and display the first application on the display 160. For example, the electronic device 101 may display a list of text messages and the first application that may display the content of a text message selected from the list, may divide the first application into at least one first region 1010 for registering fingerprints and a second region 1020 for displaying at least one object and sensing a fingerprint inputted to the object, and may display the first application divided into the first region and the second region. The first region 1010 may include at least one function depending on the type or purpose of the displayed application. For example, when the first application is an application to display the list or content of text messages, the electronic device 101 may divide the first application into the first region 1010 including various functions that the first application provides such as a "delete" function 1011 to delete a message, a "share" function 1012 to share a message, and a "save" function 1013 to save a message, and the second region 1020 including a list of at least one message.

Referring to FIG. 10B, upon sensing a fingerprint of an index finger 1030 from a sub region corresponding to a first function "delete" 1011 of the first region 1010 while displaying, on the display 160, the first application including the first region 1010 including various functions, such as "delete" 1011, "share" 1012, and "save" 1013, and the second region 1020 including a list of at least one message, the electronic device 101 may map the fingerprint of the index finger 1030 to the first function "delete" 1011 and store the result in the memory 130. The electronic device 101 may map the fingerprint of the index finger 1030 to the first function "delete" 1011 and temporarily store a resultant value of the mapping, such as a command for the first function 1011 or fingerprint information about the index finger or a fingerprint image, in the memory 130.

Referring to FIG. 10C, the electronic device 101 may execute a second application with the first application remaining executed or terminated on the display 160. The applications, such as the first and second application, may be the same or different from each other. Each application may include at least one function, and may include a different function depending on its type or purpose. The electronic device 101 may execute and display, on the display 160, the second application which differs from the first application, while executing the first application selected by the user. The second application may determine a third region 1040 including at least one function that is executed by the second application and a fourth region 1050 displaying various objects depending on the type of the application. The third region 1040 includes at least one function provided by the application, and the fourth region 1050 includes various text, images, and videos.

At least one function (e.g., delete 1011) included in the first region 1010 of the first application may be the same as the function included in the third region 1040 of the second application. For example, the function 1011 included in the first region 1010 of the first application may be the same as the function 1041 included in the third region 1040 of the second application. For example, the functions 1012 and 1013 included in the first region 1010 of the first application may be included in the third region 1040 of the second application. For example, the functions 1042 and 1043 included in the third region 1040 of the second application may be included in the first region 1010 of the first application.

Referring to FIG. 10D, the user may select at least one image 1051 from among a plurality of images displayed on the second region 1050 of the second application. The electronic device 101 may sense the fingerprint of the user's index finger 1060 that is inputted to select at least one image. Upon sensing the fingerprint of the index finger 1060 on the region that displays an image, such as 1051, the electronic device 101 may determine whether the fingerprint of the index finger 1060 is the same as the fingerprint of the index finger 1030 of FIG. 10B. For example, when the fingerprint of the index finger 1030 of FIG. 10B is the same as the sensed fingerprint of the index finger 1060 of FIG. 10D, the electronic device 101 may control the display 160 to delete at least one image 1051 selected by the index finger 1060 from the plurality of images not to show up on the display 160. When the image 1051 selected by the index finger 1060 is deleted from the plurality of images, the electronic device 101 may update the screen of the display 160 so that the deleted image disappears.

Figure 11:
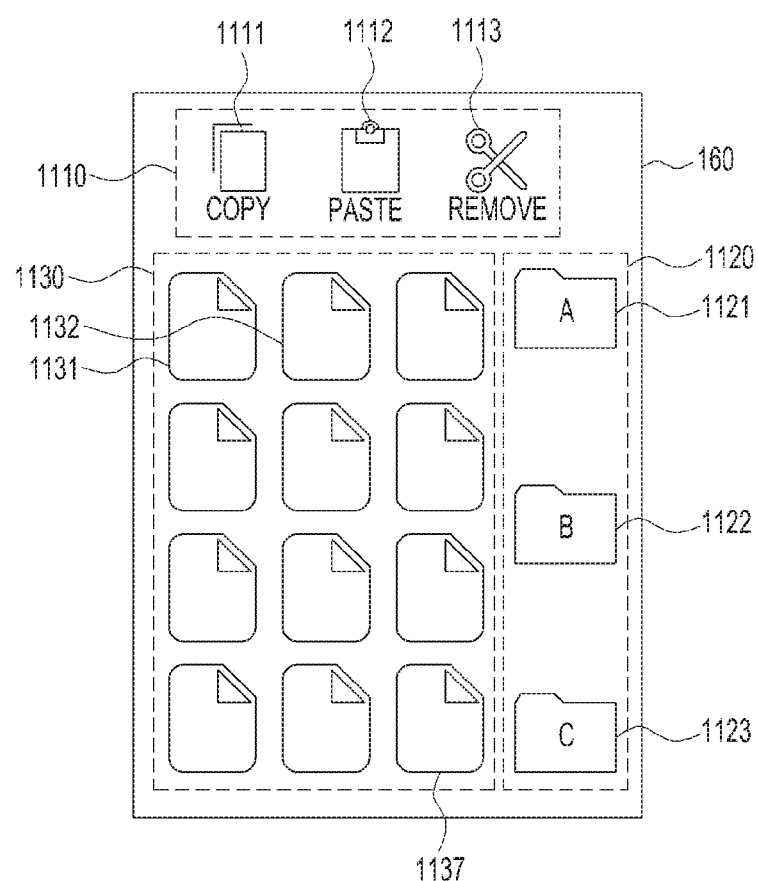
FIG. 11 illustrates an application divided into at least one first region for fingerprint mapping and a second region for displaying at least one object in an electronic device according to an embodiment of the present disclosure.

FIG. 11 illustrates an application divided into at least one first region for fingerprint mapping and a second region for displaying at least one object in an electronic device according to an embodiment of the present disclosure.

Referring to FIG. 11, the electronic device 101 may execute an application and display the application on the display 160. The electronic device 101 may divide the application into at least one first region 1110 and 1120 for registering fingerprints and a second region 1130 for displaying at least one object and sensing a fingerprint inputted to the object, and may split the first region into a third region 1110 for indicating the function to be applied to an object and a fourth region 1120 for indicating the function to reflect the function applied to the third region 1110 and display the same on the display 160.

The third region 1110 may include icons 1111, 1112, and 1113 corresponding to various functions that may be applied to the application displayed. The third region 1110 may include at least one function depending on the type or purpose of the displayed application, such as an icon 1111 for copying a file (or data or information), an icon 1112 for pasting the copied file, and an icon 1113 for removing a file. The fourth region 1120 may include icons A 1121, B 1122, and C 1123 corresponding to various functions for applying functions selected from the third region 1110. For example, when the user selects a first function 1111 to copy a file from the third region, a first folder A 1121 from the fourth region, and at least one object 1131 from the second region, the selected object 1131 may be copied and saved in the first folder A 1121. When the user selects the first function 1111 to copy a file from the third region, at least one object 1131 from the second region, and the first folder A 1121 from the fourth region, the selected object 1131 may be copied and stored in the first folder A 1121.

The term 'module' may refer to a unit including one of hardware, software, and firmware, or a combination thereof, may be interchangeably used with a unit, logic, logical block, component, or circuit, may be a minimum unit or part of an integrated component, may be a minimum unit or part of performing one or more functions, and may be implemented mechanically or electronically. For example, the module as used herein may include at least one of application specific integrated circuit (ASIC) chips, field programmable gate arrays (FPGAs), or programmable logic arrays (PLAs) that perform some steps, which have already been known or will be developed in the future.

At least a part of the device or method may be implemented as instructions stored in a computer-readable storage medium e.g., in the form of a programming module. When the instructions are executed by a control circuit, the control circuit may perform functions corresponding to the instructions. The computer-readable storage medium may be e.g., the memory 130. At least part of the programming module may be executed by the control circuit. At least part of the programming module may include a module, program, routine, set of instructions, or process for performing one or more functions.

The computer-readable recording medium may include a magnetic medium, such as a hard disk, a floppy disk, and a magnetic tape, an optical recording medium, such as a compact disc-read only memory (CD-ROM) or digital video disc (DVD), a magnetic-optical medium, such as a floptical disc, and a hardware device specially configured to store and execute program instructions, such as a read only memory (ROM), random access memory (RAM), or flash memory. Examples of the program commands may include not only machine language codes but also high-level language codes which are executable by various computing means using an interpreter. The aforementioned hardware devices may be configured to operate as one or more software modules to execute embodiments of the present disclosure, and vice versa.

Modules or programming modules in accordance with embodiments of the present disclosure may include at least one or more of the aforementioned components, omit some of them, or further include other additional components. Operations performed by modules, programming modules or other components in accordance with embodiments of the present disclosure may be carried out sequentially, simultaneously, repeatedly, or heuristically. Furthermore, some of the operations may be performed in a different order, or omitted, or include other additional operation(s). According to an embodiment of the present disclosure, there is provided a computer readable storage medium storing a program including commands for controlling a screen by sensing a fingerprint in an electronic device including a display including at least one sensor, a memory, and a processor, comprising a first command set for sensing a first fingerprint inputted to at least one first region of an application displayed on the display, a second command set for mapping the sensed first fingerprint to a function corresponding to the first region, a third command set for determining whether the first fingerprint is sensed on the display, and a second command set for applying the mapped function to the display and displaying the application.

As is apparent from the foregoing description, the present disclosure provides an electronic device and method for controlling screen using fingerprints, which may sense fingerprints through the overall display of the electronic device. According to the present disclosure, a fingerprint may be mapped to a function that is provided from an application displayed on the display. The function may be applied to at least one object displayed by the application, enhancing user convenience. A fingerprint is mapped to a first function provided from a first application. When a second application, which differs from the first application, provides a second function which is identical to the first function, the function of the second application may be controlled by the fingerprint mapped to the first function. Thus, user convenience may be enhanced.

While the present disclosure has been illustrated and described with reference to embodiments thereof, it will be understood by those skilled in the art that various changes in form and details may be made therein without departing from the spirit and scope of the present disclosure as defined by the appended claims and their equivalents.

What is claimed is:

1. An electronic device for sensing a fingerprint, the electronic device comprising:
    a display configured to include at least one sensor for sensing the fingerprint;
    a memory; and
    at least one processor electrically connected with the display and the memory,
    wherein the at least one processor is configured to:
    control the display to display an execution screen of an application;
    sense a first fingerprint inputted to one of at least one first region of the execution screen of the application displayed on the display,
    map the sensed first fingerprint to a first function corresponding to the one of the at least one first region, and
    in response to the first fingerprint being sensed on the execution screen of the application after mapping the sensed first fingerprint to the first function, apply the first function to the application,
    wherein the at least one first region corresponds to at least one function of the application, respectively.

2. The electronic device of claim 1,
    wherein the processor is further configured to:
    store the first fingerprint mapped to the first function corresponding to the one of the at least one first region in the memory, and
    in response to the first fingerprint being sensed from one of at least one second region for displaying at least one object respectively on the display, apply the first function to the at least one object.

3. The electronic device of claim 1,
    wherein the processor is further configured to display the application including the at least one first region for registering the fingerprint, and at least one second region for displaying at least one object and for sensing the fingerprint inputted to one of the at least one object.

4. The electronic device of claim 2,
    wherein, based on a same fingerprint being inputted to two or more first regions the processor is further configured to map the inputted fingerprint to two or more functions of the two or more first regions and store the mapping in the memory.

5. The electronic device of claim 2,
    wherein, based on different fingerprints being inputted to two or more first regions the processor is further configured to individually map the inputted different fingerprints to two or more functions of the two or more first regions, and store the mapping in the memory.

6. The electronic device of claim 2,
    wherein, in response to a second fingerprint being sensed from the one of the at least one first region where the first fingerprint has been sensed, the processor is further configured to update the first function mapped to the first fingerprint with the first function mapped to the second fingerprint.

7. The electronic device of claim 1,
    wherein a different fingerprint is registered once for each of the at least one first region.

8. The electronic device of claim 1,
    wherein, in response to a menu item being selected from a menu provided by the displayed application, the processor is further configured to display a window corresponding to the selected menu item on the displayed application, and
    wherein, in response to the first fingerprint being sensed from the displayed window, the processor is further configured to apply the first function to the window to control a screen.

9. The electronic device of claim 1,
    wherein, in response to a second application different from the executed application being selected, the processor is further configured to execute the second application, and
    wherein, in response to the first fingerprint being sensed from an object displayed on the second application, the processor is further configured to apply the first function mapped to the first fingerprint to the object displayed on the second application.

10. A method for sensing a fingerprint through a display including at least one sensor for sensing the fingerprint in an electronic device including the display, a memory, and a processor, the method comprising:
    displaying an execution screen of an application;
    sensing a first fingerprint inputted to one of at least one first region of the execution screen of the application displayed on the display;
    mapping the sensed first fingerprint to a first function corresponding to the one of the at least one first region; and
    in response to the first fingerprint being sensed on the execution screen of the application after mapping the sensed first fingerprint to the first function, applying the first function to the application,
    wherein the at least one first region corresponds to at least one function of the application, respectively.

11. The method of claim 10, further comprising:
storing the first fingerprint mapped to the first function corresponding to the one of the at least one first region; and
in response to the first fingerprint being sensed from one of at least one second region for displaying at least one object respectively on the display, applying the first function to the at least one object.

12. The method of claim 10, further comprising displaying the application including the at least one first region for registering the fingerprint, and at least one second region for displaying at least one object and for sensing the fingerprint inputted to one of the at least one object.

13. The method of claim 11, further comprising:
based on a same fingerprint being inputted to two or more first regions,
mapping the inputted fingerprint to two or more functions included in each of the two or more first regions.

14. The method of claim 11, further comprising:
based on different fingerprints being inputted to two or more first regions,
mapping the inputted different fingerprints to the two or more functions included in the two or more first regions.

15. The method of claim 11, further comprising, in response to a second fingerprint being sensed from the one of the at least one first region where the first fingerprint has been sensed, updating the first function mapped to the first fingerprint with the first function mapped to the second fingerprint.

16. The method of claim 11, wherein a different fingerprint is registered once for each of the at least one first region.

17. The method of claim 10, further comprising:
in response to a menu item being selected from a menu provided by the displayed application, displaying a window corresponding to the selected menu item on the displayed application; and
in response to the first fingerprint being sensed from the displayed window, applying the first function to the window to control a screen.

18. The method of claim 11, further comprising:
in response to a second application different from the executed application being selected, executing the second application; and
in response to the first fingerprint being sensed from an object displayed on the second application, applying the first function mapped to the first fingerprint to the object displayed on the second application.

19. A non-transitory computer readable storage medium storing a program including instructions for controlling a screen by sensing a fingerprint in an electronic device including a display including at least one sensor, a memory, and a processor, comprising:
displaying an execution screen of an application;
sensing a first fingerprint inputted to one of at least one first region of the execution screen of the application displayed on the display;
mapping the sensed first fingerprint to a first function corresponding to the one of the at least one first region; and
in response to the first fingerprint being sensed on the execution screen of the application after mapping the sensed first fingerprint to the first function, applying the first function to the application,
wherein the at least one first region corresponds to at least one function of the application, respectively.

* * * * *